(12) United States Patent
Tada

(10) Patent No.: US 7,788,349 B2
(45) Date of Patent: Aug. 31, 2010

(54) INFORMATION PROCESSING SYSTEM AND METHOD

(75) Inventor: Yuki Tada, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 535 days.

(21) Appl. No.: 11/740,453

(22) Filed: Apr. 26, 2007

(65) Prior Publication Data

US 2008/0140821 A1 Jun. 12, 2008

(30) Foreign Application Priority Data

Dec. 11, 2006 (JP) ............................. 2006-333599

(51) Int. Cl.
G06F 15/177 (2006.01)
(52) U.S. Cl. ................... 709/220; 709/221; 709/222; 709/223
(58) Field of Classification Search ......... 709/220–223
See application file for complete search history.

(56) References Cited

U.S. PATENT DOCUMENTS

| 6,658,489 | B1 * | 12/2003 | Asselin | 709/221 |
| 6,785,894 | B1 * | 8/2004 | Ruberg | 719/321 |
| 6,813,670 | B1 * | 11/2004 | Yao et al. | 710/302 |
| 6,904,489 | B2 | 6/2005 | Zarns | |
| 2002/0095501 | A1 * | 7/2002 | Chiloyan et al. | 709/227 |
| 2004/0215754 | A1 * | 10/2004 | Orleth et al. | 709/223 |
| 2004/0250130 | A1 | 12/2004 | Billharz et al. | |
| 2005/0240712 | A1 | 10/2005 | Klein | |
| 2006/0112311 | A1 * | 5/2006 | Cobb | 714/16 |

FOREIGN PATENT DOCUMENTS

| JP | 10-301884 | 11/1998 |
| JP | 2001-197461 | 7/2001 |
| JP | 2001-296976 | 10/2001 |
| JP | 2001-331428 | 11/2001 |
| JP | 2002-197044 | 7/2002 |
| JP | 2005-012775 | 1/2005 |
| JP | 2006-190320 | 7/2006 |

* cited by examiner

*Primary Examiner*—Thu Nguyen
*Assistant Examiner*—Nam Tran
(74) *Attorney, Agent, or Firm*—Mattingly & Malur, P.C.

(57) ABSTRACT

When it is detected that a user connects a device to a client but there is no device driver of the device in an information processing server, the device driver existing in the client is transmitted to the information processing server and is automatically installed. Further, in order to cope with even the case where it is necessary to restore the information processing server to the environment existing before utilization thereof after utilization of the information processing server is ended even if the information processing server is shared with a plurality of users, the introduction state of the device driver in the information processing server is restored.

11 Claims, 13 Drawing Sheets

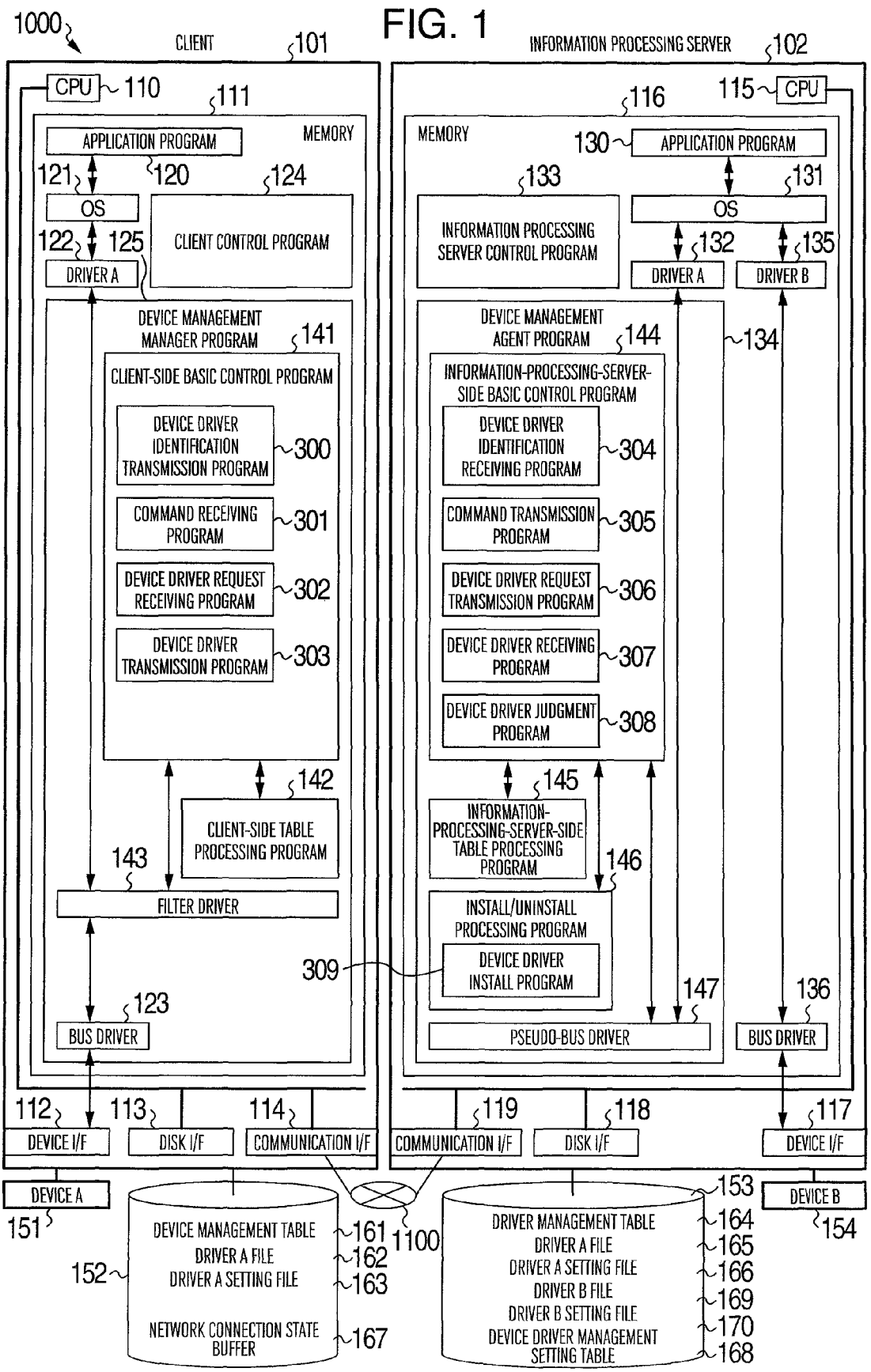

FIG. 2

DEVICE MANAGEMENT TABLE 161

| VENDOR ID (301) | PRODUCT ID (302) | SERIAL NUMBER (303) | DRIVER FILE PATH (304) | VERSION (305) | SETTING FILE PATH (306) | ACTIVE (307) |
|---|---|---|---|---|---|---|
| 1001 | 1001 | 10000001 | C:¥WinNT¥system32¥drivers¥AAAA.sys | 1.00 | C:¥WinNT¥inf¥aaaa.inf | Yes |
| 2001 | 2001 | 20000001 | C:¥WinNT¥system32¥drivers¥BBBB.sys | 1.01 | C:¥WinNT¥inf¥bbbb.inf | No |
| 3001 | 3001 | 30000001 | C:¥WinNT¥system32¥drivers¥CCCC.sys | 2.00 | C:¥WinNT¥inf¥cccc.inf | No |
| ····· | ····· | ····· | ····· | ····· | ····· | ····· |

FIG. 3

DRIVER MANAGEMENT TABLE 164

| VENDOR ID (401) | PRODUCT ID (402) | DRIVER FILE NAME (403) | VERSION (404) | SETTING FILE NAME (405) | INTRODUCTION STATE (406) | SAVING PATH (407) | REMOTE UTILIZATION (408) |
|---|---|---|---|---|---|---|---|
| 1001 | 1001 | AAAA.sys | 1.00 | aaaa.inf | TEMPORARY SAVING | C:¥drivershare¥user001 | No |
| 1001 | 1001 | AAAA.sys | 1.01 | aaaa.inf | IN REMOTE INTRODUCTION | — | Yes |
| 3001 | 3001 | CCCC.sys | 2.00 | cccc.inf | SAVING | C:¥drivershare | No |
| 4001 | 4001 | DDDD.sys | 3.00 | dddd.inf | INTRODUCED | — | No |
| ····· | ····· | ····· | ····· | ····· | ····· | ····· | ····· |

FIG. 4

NETWORK CONNECTION STATE BUFFER  ⌒167

| REMOTE CONNECTION STATE (501) |
|---|
| CONNECTED |

FIG. 5

DEVICE DRIVER MANAGEMENT SETTING TABLE  ⌒168

| TERMINAL UTILIZATION SETTING (601) | SAVING PATH SETTING (602) |
|---|---|
| SHARED | C:¥drivershare |

INFORMATION PROCESSING SYSTEM AND METHOD

RELATED APPLICATION

This application is related to U.S. application Ser. No. 11/363,509 filed Feb. 24, 2006, the entire disclosure of which is incorporated herein by reference.

INCORPORATION BY REFERENCE

This application relates to and claims priority from Japanese Patent Application No. 2006-333599 filed on Dec. 11, 2006, the entire disclosure of which is incorporated herein by reference.

BACKGROUND OF THE INVENTION

The present invention relates to technique of enable a service provider apparatus to utilize a device connected to a service user apparatus in the same manner as a case where the device is directly connected to the service provider apparatus in an information processing system including the service user apparatus to which the device is connected and the service provider apparatus connected to enable communication with the service user apparatus to receive input data inputted to the service user apparatus therefrom and execute information processing in accordance with the input data so that service of transmitting result of the execution to the service user apparatus is provided.

A remote operation system is developed in which a service user apparatus (hereinafter also referred to as an operation terminal or a client) which receives input data from a user transmits the input data to a service provider apparatus (hereinafter also referred to as an operated terminal or an information processing server) connected through a network and the information processing server executes information processing in accordance with the input data to display picture data indicating result of the execution in a display of the client (e.g. JP-A-2001-331428 and JP-A-2001-197461).

SUMMARY OF THE INVENTION

An information processing system comprises a service user apparatus and a service provider apparatus. The service user apparatus includes a device driver to output a command to a device, a bus driver to acquire the command and transmit it to the device, a device driver identification transmission part, a command receiving part and a filter driver to deliver the command received by the command receiving part to the bus driver. The service provider apparatus includes a device driver identification receiving part to receive identification information of the device driver, a device driver installing part to install the device driver, a pseudo-bus driver to acquire a command outputted by the installed device driver and a command transmission part to transmit the command acquired by the pseudo-bus driver.

Other objects, features and advantages of the invention will become apparent from the following description of the embodiments of the invention taken in conjunction with the accompanying drawings.

BRIEF DESCRIPTION OF THE DRAWINGS

FIG. 1 is a diagram showing an example of hardware configuration and program structure of a remote operation system;

FIG. 2 is a diagram showing an example of a device management table stored in a storage;

FIG. 3 is a diagram showing an example of a driver management table stored in the storage;

FIG. 4 is a diagram showing an example of a network connection state buffer;

FIG. 5 is a diagram showing an example of a device driver management setting table;

DESCRIPTION OF THE EMBODIMENTS

Figure 6:
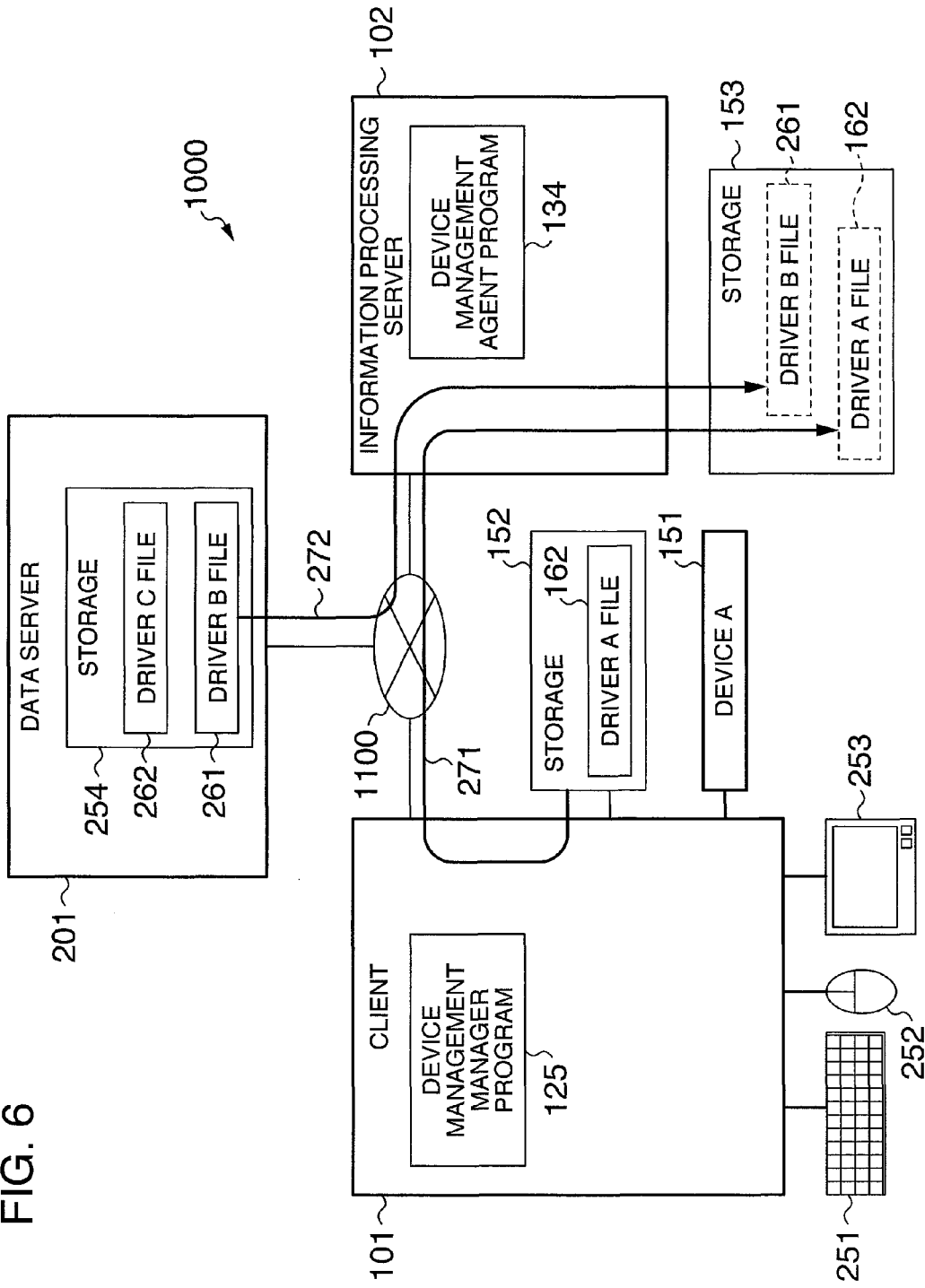
FIG. 6 is a schematic diagram illustrating an example of system configuration illustrating the remote operation system.

In a remote operation system, since actual processing operation is performed by an information processing server when a client is a thin client, a device connected to the client cannot be directly controlled and utilized by an operating system (OS) and an application on the side of the information processing server when data on the side of the information processing server is desired to be outputted to a device such as a printer connected to the client or when the information processing server is desired to read out data from a device such as an IC card reader connected to the client.

Accordingly, in order to enable the information processing server to use the device connected to the client, it is considered that a device management manager is provided in the client and a device management agent is provided in the information processing server.

The device management manager is a program for realizing a filter driver for controlling exclusively transmission and reception of data between the device connected to the client and the application executed by the client and transmission and reception of data between the device connected to the client and the information processing server or communication measures between the information processing server and the device management manager.

The device management agent is a program for realizing a pseudo-bus driver that functions as a bus driver virtually between the application executed by the information processing server and the device management agent or communication measures between the client and the device management agent.

Concretely, when the device is connected to the client, the filter driver stores plugging-in data outputted by the device in a memory and when the client issues a plugging-in instruction to the information processing server, the plugging-in data is transmitted to the information processing server and the pseudo-bus driver spuriously gives the plugging-in data to the device driver installed in the information processing server as a response.

As described above, the response is given to the device driver of the information processing server as if the device connected to the client were directly connected to the information processing server, so that the operating system (OS) of the information processing server can utilize the device connected to the client.

When the device is connected to the client, the operating system executed by the client carries out the plugging-in processing of the device. In the plugging-in processing, the plugging-in data for making the operating system to recognize the device is transmitted and received between the operating system, the device driver and the device.

The filter driver filters data transmitted and received between the device driver and the device. Thus, the data transmitted and received between the device driver and the device can be monitored and stored. When the plugging-in data is outputted by the device connected to the client, the plugging-in data is captured by the filter driver and when the client issues the plugging-in instruction to the information processing server, the plugging-in data is transmitted to the information processing server.

When the information processing server receives the plugging-in data, the pseudo-bus driver delivers the plugging-in data to the device driver installed in the information processing server. The plugging-in processing is carried out using the plugging-in data. In this manner, the operating system (OS) of the information processing server recognizes the device connected to the client.

When a request is issued to the device from the operating system or an application of the information processing server after the information processing server recognizes the device connected to the client, the pseudo-bus driver of the information processing server receives the request and transmits it to the filter driver of the client.

The filter driver of the client transmits the received request to the device. When the request is processed by the device, the device outputs a response as the result of the processing. The response is transmitted to the pseudo-bus driver of the information processing server through the filter driver. The pseudo-bus driver returns the response received from the filter driver to the operating system or the application executed by the information processing server. Consequently, the operating system or the application executed by the information processing server can access the device connected to the client.

By the above-mentioned measures, the information processing server can perform the processing to the device connected to the client in the same manner as the case where the device is directly connected to the information processing server.

However, when the device driver executed by the information processing server is different from that executed by the client in case where the device connected to the client is utilized from the information processing server, utilization environment is different depending on whether the device is utilized from the client or from the information processing server even if the same device is utilized. Accordingly, the handling by the user becomes worse and the operation efficiency is deteriorated.

Further, the device connected to the client is, for example, a special device and it is necessary to execute the device driver having a special function in order to utilize the device, although when the information processing server did not utilize the device in the past, the device driver must be installed in the information processing server each time the device is utilized, so that the operability is deteriorated.

It is an object of the embodiment to enable the device connected to the client to be utilized from the information processing server in the same utilization environment as the case where the device is utilized from the client.

The information processing system comprises a service user apparatus and a service provider apparatus. The service user apparatus includes a device driver to output a command to a device, a bus driver to acquire the command and transmit it to the device, a device driver identification transmission part, a command receiving part and a filter driver to deliver the command received by the command receiving part to the bus driver. The service provider apparatus includes a device driver identification receiving part to receive identification information of the device driver, a device driver installing part to install the device driver, a pseudo-bus driver to acquire a command outputted by the installed device driver and a command transmission part to transmit the command acquired by the pseudo-bus driver.

According to the above aspect, the device connected to the service user apparatus can be utilized from the service provider apparatus in the same utilization environment as the case where the device is utilized from the service user apparatus.

The information processing system including the service user apparatus to which the device is connected and the service provider apparatus connected to enable communication with the service user apparatus to receive input data inputted to the service user apparatus therefrom and execute information processing in accordance with the input data so that service of transmitting result of the execution to the service user apparatus is provided, enables the device connected to the service user apparatus to be utilized from the service provider apparatus in the same utilization environment as the case where the device is utilized from the service user apparatus.

FIG. 1 is a diagram showing an example of hardware configuration and software structure of a remote operation system 1000 according to the embodiment.

The remote operation system 1000 constitutes an information processing system including a client 101 and an information processing server 102 which are connected through a network 1100 to each other so that the client and the information processing server can communicate with each other through the network. The remote operation system 1000 shown in FIG. 1 includes the single client 101 and the single information processing server 102, although both of them may be plural in number.

The client 101 is composed of a computer which can be connected to the network 1100 from various places such as a place where the user went on a business trip, user's home and a place on the way of user's movement so that the client 101 can communicate with the information processing server 102. When the client 101 receives input data from the user, the client transmits the input data to the information processing server 102. The client 101 receives picture data indicating execution result of information processing executed by the information processing server 102 in accordance with the input data from the information processing server 102 to display it.

The client 101 may be composed of, for example, a thin client. It is a matter of course that the client 101 may be composed of a general computer such as a notebook-type personal computer and a personal digital assistant (PDA).

The information processing server 102 is composed of a computer which executes information processing in accordance with the input data transmitted from the client 101 and produces screen view data indicating its execution result to transmit it to the client 101.

The information processing server 102 may be composed of individual blade computers constituting a blade server, for example. The blade computer is constituted by a board which is integrally formed to function as a computer and a plurality of blade computers having the same standards are mounted in a housing to constitute the blade server. It is a matter of course that the information processing server 102 may be composed of a computer such as a personal computer, a workstation and a mainframe.

The hardware configuration of the remote operation system 1000 is now described. The client 101 includes a central processing unit (CPU) 110, a memory 111, a device interface (I/F) 112, a disk interface (I/F) 113 and a communication interface (I/F) 114. The device interface 112 is to connect a device A 151.

The client 101 may be equipped with a plurality of device interfaces 112 in accordance with various standards such as USB (Universal Serial Bus) (registered trademark), serial port interfaces and IEEE (Institute of Electrical and Electronic Engineers) 1394. The device interfaces 112 may be provided for each kind of devices. Input/output devices such as keyboard, mouse and display not shown may be connected to the device interfaces 112 corresponding to the respective devices.

The device A 151 is a so-called peripheral device such as printer and IC (integrated circuit) card reader and is connected to the client 101 through the device interface 112. The device A 151 includes a memory disposed therein and device identification information such as manufacture vendor ID, product ID and serial number is stored in the memory. These pieces of device identification information are outputted from the device A 151 to be supplied to the client 101 when the device A 151 is connected to the device interface 112.

The disk interface 113 is to connect a storage 152 such as a hard disk drive and a flash memory.

The communication interface 114 is to connect the network 1100 such as local area network (LAN) and wide area network (WAN) to make communication with other computers. In the embodiment, the client 101 and the information processing server 102 communicate with each other through the network 1100 in accordance with the communication standard of TCP/IP (Transmission Control Protocol/Internet Protocol).

The information processing server 102 includes a central processing unit (CPU) 115, a memory 116, a device interface (I/F) 117, a device interface 118 and a communication interface 119.

The device interface 117 is to connect various devices including a printer. The information processing server 102 may be equipped with a plurality of device interfaces 117 in accordance with various standards such as USB (registered trademark), serial port interfaces and IEEE (Institute of Electrical and Electronic Engineers) 1394. The device interfaces 117 may be provided for each kind of devices. Input/output devices such as keyboard, mouse and display not shown may be connected to the device interfaces 117 corresponding to the respective devices. However, the information processing server 102 according to the embodiment does not require a user interface and it is not necessary to connect a display, a keyboard and a mouse to the information processing server 102.

The disk interface 118 is to connect a storage 153 such as hard disk drive and flash memory. The communication interface 119 is to connect the network such as local area network (LAN) and wide area network (WAN) to make communication with other computers.

The software structure of the remote operation system 1000 is now described. The client 101 executes an application program 120, an operating system (OS) 121, a driver A 122, a bus driver 123, a client control program 124 and a device management manager program 125. The device management manager program 125 includes a client-side basic control program 141, a client-side table processing program 142 and a filter driver 143.

These programs read in the memory 111 are executed by the CPU 110 to realize processing parts of the client 101. For example, various programs such as the client control program 124, the client-side basic control program 141 and the client-side table processing program 142 stored in the memory 111 are executed by the CPU 110 to perform various processing operations.

The various processing operations are performed by making the CPU 110 execute the programs, although the processing operations may be realized in hardware by forming processing parts for making various processing operations such as a client control part, a client-side basic control part and a client-side table processing part into integrated circuits.

For simplicity of description, each program is described as a subject of each processing operation, although when the processing parts are realized in hardware, each processing part behaves as a subject to perform each processing operation.

The client-side basic control program 141 contains a device driver identification transmission program 300, a command receiving program 301, a device driver request receiving program 302 and a device driver transmission program 303. These programs are executed by the CPU 110, so that respective functions of a device driver identification transmission part, a command receiving part, a device driver request receiving part and a device driver transmission part described in the Claims are realized.

Further, stored in the storage 152 are a device management table 161, a driver A file 162, a driver A setting file 163 and a network connection state buffer 167.

The driver A file 162 is a driver file corresponding to the driver A 122 and when the operating system 121 loads the driver A file 162 into the memory 111, the driver A file 162 operates as the driver A 122. The driver A setting file 163 is a file for setting the driver A 122 upon installation.

Although detailed description is made later, the driver A file 162 and the driver A setting file 163 are transmitted to the information processing server 102 when the information processing server 102 requires them.

The client control program 124 controls to transmit data (input data) inputted by the user using a keyboard or a mouse to the information processing server 102 and receive screen view data transmitted from the information processing server 102 to display it in a display.

Further, the client control program 124 controls to receive notification of every kind from the device management manager program 125 and display a message corresponding to the contents of the notification in the display. In addition, the client control program 124 executes various controls for making the user log in the information processing server 102 from the client 101.

The application program 120 may be, for example, a user authentication program for confirming the user by authentication using a fingerprint. The application program 120 can access the device A 151 connected to the device interface 112 through the operating system 121, the driver A 122 and the bus driver 123 and perform input/output of data.

The operating system 121 is a program for controlling a variety of hardware constituting the client 101. Further, the operating system 121 controls transmission and reception of data between the application program 120 and the driver A 122 when the application program 120 performs transmission and reception of data between the device A 151 and the application program 120.

The operating system 121 manages whether the device A 151 is connected to each device interface 112 or not and whether the device A 151 can be utilized or not.

When the device A 151 is connected to the device interface 112, the device A 151 outputs the device identification information containing vendor ID, product ID and serial number thereof. The device identification information is sometimes contained in plugging-in data outputted from the device A 151 when the device A 151 is connected to the device interface 112. When the bus driver 123 receives the device identification information from the device A 151, the bus driver 123 delivers it to the operating system 121 together with identification information of the device interface 112.

The operating system 121 stores the device identification information in the memory 111 so as to have a correspondence relationship with the identification information of the device interface 112. Further, the operating system 121 specifies the device A 151 on the basis of the device identification information. The operating system 121 loads the driver A 122 for controlling the specified device A 151 into the memory 111. Installation of the driver A 122 is made by loading the driver A file 162 into the memory 111 as the driver A 122 in accordance with the driver A setting file 163 stored in the storage 152. The operating system 121 sets a flag to the effect that the device A 151 is being controlled. Consequently, the operating system can utilize the device A 151. The processing that the operating system 121 enable the device A 151 to be utilized is hereinafter also referred to as plugging-in processing.

On the other hand, when the device A 151 is removed or disconnected from the device interface 112, the removal is detected by the bus driver 123. The bus driver 123 notifies the message to that effect to the operating system 121 together with the identification information of the device interface 112. The operating system 121 specifies the removed device A 151 on the basis of the device identification information stored in the memory 111 in a correspondence relationship manner with the identification information of the device interface 112. The operating system 121 sets a flag to the effect that control of the device A 151 is being ended. The operating system 121 stops utilization of the device A 151. The processing that the operating system 121 stops utilization of the device A 151 is hereinafter also referred to as plugging-out processing. After this, the driver A 122 may be uninstalled.

The driver A 122 is a program (device driver) for controlling the device A 151. For example, when the device A 151 is a printer, the driver A 122 controls starting of a printer, feeding of printing paper, size of printed characters, resolution of image and the like. The driver A 122 is stored in the storage 152 or the like as the driver A file 162 originally and when the device A 151 is connected to the device interface 112, the driver A 122 is loaded into the memory 111 from the storage 152 or the like. The driver A 122 controls transmission and reception of data performed between the operating system 121 and the bus driver 123 when the application program 120 performs input/output of data between the device A 151 and the application program 120. Although detailed description is made later, the driver A 122 performs transmission and reception of data between the bus driver 123 and the driver A 122 through the filter driver 143 in the embodiment.

The bus driver 123 is a program for controlling transmission and reception of data performed between the driver A 122 and the device interface 112 and controlling communication between the client 101 and the device A 151. For example, when the bus driver 123 receives data indicating the operation state of the device A 151 and various interrupt signals transmitted from the device A 151 through the device interface 112, the bus driver 123 delivers it to the driver A 122. Further, although detailed description is made later, the bus driver 123 performs transmission and reception of data between the driver A 122 and the bus driver 123 through the filter driver 143.

The device management manager program 125 is a program to enable an operating system 131 of the information processing server 102 to control the device A 151 connected to the client 101. To enable the operating system 131 of the information processing server 102 to control the device connected to the client 101 is also described as remote utilization of the device. The device management manager program 125 includes the client-side basic control program 141, the client-side table processing program 142 and the filter driver 143.

The filter driver 143 is a program for executing processing serving as the bus driver 123 to the driver A 122 and the operating system 121 and executing processing serving as the driver A 122 and the operating system 121 to the bus driver 123. Thus, the filter driver 143 can acquire the data delivered to the driver A 122 from the bus driver 123 (the acquisition operation is hereinafter also referred to as filtering) and deliver it to the client-side basic control program 141. Further, the filter driver 143 can deliver the data delivered from the client-side basic control program 141 to the bus driver 123 as if it were the data delivered from the driver A 122.

Consequently, when the client-side basic control program receives a request to the device A 151 from the information processing server 102, the filter driver 143 can transmit the request to the device A 151 and get a response to the request from the device A 151, so that the request can be returned to the information processing server 102 through the client-side basic control program 141. In addition, when an event such as connection and disconnection of the device A 151 occurs, the filter driver 143 can acquire the identification information of the device A 151 and notify it to the client-side basic control program 141 to thereby monitor the event such as connection and disconnection of the device A 151.

The client-side table processing program 142 is a program for performing preparation, storing, update and acquisition of data for the device management table 161 and the like in accordance with instructions from the client-side basic control program 141.

The client-side basic control program 141 is a program for transmitting the data acquired by the filter driver 143 to the information processing server 102 and delivering the data transmitted from the information processing server 102 to the filter driver 143. Further, the client-side basic control program 141 instructs the client-side table processing program 142 to update the device management table 161.

The device management table 161 is stored in the storage 152. An example of the device management table 161 is shown in FIG. 2.

The device management table 161 includes vendor ID 301 and product ID 302 that are identification information of devices, serial numbers 303 assigned to individual products, driver file paths 304 of drivers corresponding to devices, versions 305, setting file paths 306 of the drivers and active 307 indicating operation states of the devices.

The vendor ID 301, the product ID 302 and the serial number 303 are used by the device management manager program 125 in order to uniquely identify the devices together with classification of the products. The driver file path 304, the version 305 and the setting file path 306 are information about the device driver corresponding to the device identified uniquely by the vendor ID 301, the product ID 302 and the serial number 303 and already installed in the client 101. The path in the storage 152 in which the driver file corresponding to the device driver is stored and the name of the driver file are stored in the driver file path 304. The path in the storage 152 in which the driver setting file corresponding to the device driver is stored and the name of the driver setting file are stored in the setting file path 306.

The version 305 indicates the version of the driver file existing in the driver file path 304 and is used when the information processing server 102 examines the introduction state of the driver and the version is compared with that of the driver introduced in the information processing server 102. Detailed description is made later.

The active 307 is set to "Yes" when the device is being operated (when the operating system 121 is controlling the device) and set to "No" when the device is not operated (when the operating system 121 ends control of the device). This information is used when it is judged whether there is any active device in the client 101 or not and which device is active before the device management manager program 125 transmits active device information (including all data having the active 307 set to "Yes" of data in the device management table 161) to the information processing server 102. The active 307 is updated by the client-side table processing program 142 of the device management manager program 125 when the device management manager program 125 detects connection or disconnection of the device.

The values and information in the device management table 161 may be previously set by a manager for all devices which can be used by the client 101. When the manager does not authorize the user of the client 101 to update the data in the storage 152 and authorizes the user only to refer to the contents thereof, the vendor ID 301, the product ID 302, the serial number 303 and the active 307 may be held in the buffer and be updated instead of updating the information of the active 307 when the operation state of the device is changed.

The network connection state buffer 167 stored in the storage 152 is now described. FIG. 4 is a diagram showing an example of the network connection state buffer 167. The network connection state buffer 167 is a buffer for temporarily storing a remote connection state of the client 101. The network connection state buffer 167 includes a remote connection state 501.

The remote connection state 501 is set to "connected" when the client 101 currently makes remote connection to the information processing server 102 and set to "disconnected" when the remote connection is not made. The information of the remote connection state 501 is updated by the device management manager program 125 at the timing that the remote connection state of the client 101 is changed. The timing that the information is updated and use of the information will be described with reference to FIGS. 9 to 11.

Returning now to FIG. 1, the software structure of the information processing server 102 is described. The information processing server 102 executes an application program 130, the operating system 131, a driver A 132, a driver B 135, a bus driver 136, an information processing server control program 133 and a device management agent program 134. The device management agent program 134 contains an information-processing-server-side basic control program 144, an information-processing-server-side table processing program 145, an install/uninstall processing program 146 and a pseudo-bus driver 147.

These programs stored in the memory 116 are executed by the CPU 115 to thereby realize respective processing parts of the information processing server 102. The various programs such as, for example, the information processing server control program 133, the information-processing-server-side basic control program 144, the information-processing-server-side table processing program 145 and the install/uninstall processing program 146 stored in the memory 116 are executed by the CPU 115 to thereby perform various processing operations.

The various processing operations are performed by causing the CPU 110 to execute the programs, though the processing operations may be realized in hardware by forming processing parts for making various processing operations such as an information processing server control part, an information-processing-server-side basic control part, an information-processing-server-side table processing part and an install/uninstall processing part into integrated circuits.

For simplicity of description, each program is described as a subject of each processing operation, though, when the processing parts are realized in hardware, each processing part behaves as a subject to perform each processing operation.

The information-processing-server-side basic control program 144 contains a device driver identification receiving program 304, a command transmission program 305, a device driver request transmission program 306, a device driver receiving program 307 and a device driver judgment program 308. These programs are executed by the CPU 115, so that respective functions of a device driver identification receiving part, a command transmission part, a device driver request transmission part, a device driver receiving part and a device driver judgment part described in Claims are realized. Further, the install/uninstall processing program 146 contains a device driver install program 309. The device driver install program 309 is executed by the CPU 115, so that the function of a device driver install part described in Claims is realized.

Stored in the storage 153 are a driver management table 164, a driver A file 165, a driver A setting file 166, a driver B file 169, a driver B setting file 170 and a device driver management setting table 168.

The driver A file 165 is a driver file corresponding to the driver A 132 and the driver A setting file 166 is a driver setting file corresponding to the driver A 132. The driver B file 169 is a driver file corresponding to the driver B 135 and the driver B setting file 170 is a driver setting file corresponding to the driver B 135.

The information processing server control program 133 is a program for receiving the data (input data) inputted to the client 101 through the client control program 124 and transmitting picture data indicating execution result of information processing executed in accordance with the input data to the client 101. Further, the information processing server control program 133 executes various controls for making the user log in the information processing server 102 from the client 101.

The application program 130 is a program for executing information processing in accordance with input data transmitted from the client 101. The application program may be, for example, a word processing program, a table calculation program, a database management program, an electronic mail transmission/reception program and the like. The application program 130 can access a device B 154 connected to the device interface 117 through the operating system 131, the driver B 135 and the bus driver 136 to perform input/output of data to the device B 154.

The operating system 131 is a program for controlling a variety of hardware constituting the information processing server 102. Further, the operating system 131 controls transmission and reception of data between the application program 130 and the driver B 135 when the application program 130 performs input/output of data between the device B 154 and the application program 130.

The operating system 131 manages whether the device B 154 is connected to each of the device interfaces 117 of the information processing server 102 or not and whether the device B 154 can be utilized or not.

When the device B 154 is connected to the device interface 117, the device B 154 outputs the device identification information containing the vendor ID, the product ID and the serial number of the device B 154. The device identification information is also sometimes contained in the plugging-in data outputted by the device B 154 when the device B 154 is connected to the device interface 117. When the bus driver 136 receives the device identification information from the device B 154, the bus driver 136 delivers it to the operating system 131 together with the identification information of the device interface 117. The operating system 131 stores the device identification information in the memory 116 in a correspondence relationship manner with the identification information of the device interface 117.

Further, the operating system 131 specifies the device B 154 on the basis of the device identification information and loads the driver B 135 for controlling the specified device B 154 into the memory 116. The driver B 135 is installed by loading the driver B file 169 into the memory 116 as the driver B 135 in accordance with the driver B setting file 170 stored in the storage 153. Then, the operating system 131 sets a flag to the effect that the device B 154 is being controlled. Consequently, the operating system 131 can utilize the device B 154. Thus, the operating system 131 carries out the plugging-in processing for enabling the device B 154 to be utilized.

On the other hand, when the device B 154 is removed from the device interface 117, the removal is detected by the bus driver 136. The bus driver 136 notifies a message to that effect to the operating system 131 together with the identification information of the device interface 117. Then, the operating system 131 specifies the removed device B 154 on the basis of the device identification information stored in the memory 116 in a correspondence relationship manner with the identification information of the device interface 117. The operating system 131 sets a flag to the effect that control of the device B 154 is being ended. Consequently, the operating system 131 stops utilization of the device B 154. Thus, the operating system 131 carries out the plugging-out processing for stopping utilization of the device B 154. Thereafter, the driver B 135 may be uninstalled.

The driver B 135 is a program (device driver) for controlling the device B 154. For example, when the device B 154 is a printer, the driver B 135 controls starting of a printer, feeding of printing paper, size of printed characters, resolution of image and the like. The driver B 135 is stored in the storage 153 or the like as the driver B file 169 originally and when the device B 154 is connected to the information processing server 102, the driver B 135 is loaded into the memory 116 from the storage 153 or the like. The driver B 135 controls transmission and reception of data performed between the operating system 131 and the bus driver 136 when the application program 130 performs input/output of data between the device B 154 and the application program 130.

The driver A 132 is a program (device driver) for controlling the device A 151. For example, when the driver A 151 is a printer, the driver A 132 controls starting of a printer, feeding of printing paper, size of printed characters, resolution of image and the like. The driver A 132 is stored in the storage 153 or the like as the driver A file 165 originally and when the device A 151 is connected to the client 101, the driver A 132 is loaded into the memory 116 from the storage 153 or the like. The driver A 132 controls transmission and reception of data performed between the operating system 131 and the pseudo-bus driver 147 when the application program 130 performs input/output of data between the device A 151 and the application program 130.

The bus driver 136 is a program for controlling transmission and reception of data performed between the driver B 135 and the device interface 117 and controlling communication between the information processing server 102 and the device B 154. For example, when the bus driver 136 receives data indicating the operation state of the device B 154 or various interrupt signals transmitted from the device B 154 through the device interface 117, the bus driver 136 delivers them to the driver B 135.

The device management agent program 134 is a program for enabling the operating system 131 of the information processing server 102 to control the device A 151 connected to the client 101. The device management agent program 134 includes the information-processing-server-side basic control program 144, the information-processing-server-side table processing program 145, the install/uninstall processing program 146 and the pseudo-bus driver 147.

The pseudo-bus driver 147 is a program for behaving as a virtual bus driver of the information processing server 102. That is, the pseudo-bus driver 147 executes processing to the driver A 132 as if the driver 147 controlled transmission and reception of data performed between the driver A 132 and the device interface 117. Accordingly, the driver A 132 performs transmission and reception of data between the pseudo-bus driver 147 and the driver A 132 in the same manner as the case where the device A 151 is connected to the device interface 117.

Further, as described above, when the device A 151 is connected to the device interface 112 of the client 101, the device identification information containing a maker and a product number of the device A 151 is acquired by the filter driver 143 and is transmitted from the client-side basic control program 141 to the information-processing-server-side basic control program 144 together with the identification information of the device interface 112. When the pseudo-bus driver 147 receives the device identification information and identification information of the device interface 112 from the information-processing-server-side basic control program 144, the pseudo-bus driver 147 delivers them to the operating system 131. The operating system 131 carries out plugging-in processing of the device A 151 connected to the device interface 112 of the client 101.

When the application program 130 intends to access the device A 151 to generate a request to the device A 151 and the pseudo-bus driver 147 receives the request from the driver A 132, the pseudo-bus driver 147 transmits the request to the client 101 through the information-processing-server-side basic control program 144. When the pseudo-bus driver 147 receives a response to the request from the information-processing-server-side basic control program 144, the pseudo-bus driver 147 returns the response to the driver A 132.

Further, when the device A 151 is removed from the device interface 112 of the client 101, a message to that effect is transmitted from the filter driver 143 to the information-processing-server-side basic control program 144 through the client-side basic control program 141 together with the identification information of the device interface 112. Then, when the pseudo-bus driver 147 receives the message from the information-processing-server-side basic control program 144, the pseudo-bus driver 147 delivers it to the operating system 131 together with the identification information of the device interface 112. The operating system 121 specifies the removed device A 151 on the basis of the identification information of the device interface 112 and carries out the plugging-out processing of the device A 151.

The information-processing-server-side table processing program 145 is a program for performing preparation, storing of data, update and acquisition processing for the driver management table 164 in response to an instruction from the information-processing-server-side basic control program 144.

The install/uninstall processing program 146 performs installation processing of the driver using the driver A file 162 and the driver A setting file 163 transmitted from the client 101 and uninstalling processing of the driver after the remote utilization of the device in response to an instruction from the information-processing-server-side basic control program 144.

The information-processing-server-side basic control program 144 transmits the data acquired by the pseudo-bus driver 147 to the client 101 and transmits the data transmitted from the client 101 to the pseudo-bus driver 147. Further, the information-processing-server-side basic control program 144 instructs the information-processing-server-side table processing program 145 and the install/uninstall processing program 146 to perform processing.

The driver management table 164 is stored in the storage 153. FIG. 3 shows an example of the driver management table 164.

The driver management table 164 includes vendor IDs 401 and product IDs that are identification information of devices, driver file names 403, versions 404 and setting file names 405, introduction states 406, saving path 407 and remote utilization 408 of the drivers corresponding to the devices.

The vendor ID 401 and the product ID 402 are used to identify the device. The driver file name 403 is a file name of the driver file corresponding to the device identified by the vendor ID 401 and the product ID 402. Similarly, the setting file name 405 is a file name of the driver setting file corresponding to the device identified by the vendor ID 401 and the product ID 402.

The version 404 represents a version of the driver file designated by the driver file name 403 and is used when the information processing server 102 examines the introduction state of the driver and compares the version with the version of the driver introduced in the client 101.

The introduction state 406 is referred to when the device management agent program 134 examines the introduction states of the device drivers in the information processing server 102. The introduction state 406 is set to "temporary saving", "saving", "in remote introduction", "introduced" and "nothing" in accordance with the introduction states.

The "temporary saving" represents the state that the driver installed before the remote utilization is started is temporarily uninstalled and saved while the information processing server 102 remote-utilizes the device connected to the client 101 in order to enable the driver to be restored and re-installed later.

The "saving" represents the state that the driver file and the driver setting file are saved in the storage 153 in order to enable the driver to be directly installed from the inside of the information processing server 102 without transmitting the driver when the user carries out the remote connection to the information processing server 102.

The "in remote introduction" represents that the driver is installed on the basis of the driver file and the driver setting file transmitted from the client 101 and as a result the driver is being utilized currently.

The "introduced" represents the state that the driver is already installed in the information processing server 102 and can be utilized.

The "nothing" represents the state that the driver is not installed and not saved.

The value or information of the introduction state 406 is updated by the information-processing-server-side table processing program 145 of the device management agent program 134 at the timing that the introduction state of the device driver is changed. The timing that the information is updated and use of the information will be described in detail with reference to FIGS. 13 to 16.

The saving path 407 is used only when the introduction state 406 is "temporary saving" or "saving" and represents the saving destination path in the storage 153 of the relevant driver file and driver setting file. The saving path 407 is referred to when the driver is installed from the saving destination path.

The remote utilization 408 represents whether the driver is being remote-utilized or not and is set to "Yes" when the driver is being remote-utilized and to "No" when it is not remote-utilized. The remote utilization 408 is used to specify the driver being remote-utilized when the remote disconnection processing is made from the client 101 to the information processing server 102.

FIG. 5 shows an example of the device driver management setting table 168 for setting information for a device driver management method of the information processing server 102. The table includes terminal utilization setting 601 and saving path setting 602, which are previously set in a registry of the operating system 131 of the information processing server 102 by a manager.

The terminal utilization setting 601 is set to "exclusive" when only one client 101 is an operation source of the information processing server 102 and there is no possibility that other clients 101 are not connected to the information processing server 102. On the other hand, the terminal utilization setting 601 is set to "shared" when there is a possibility that a plurality of clients 101 are connected to the information processing server 102.

The terminal utilization setting 601 is used by the device management agent program 134 when it is judged whether the device driver is left in the information processing server 102 or is uninstalled after it has been saved in case where the remote disconnection is made after the device driver is remote-introduced from the client 101.

The saving path setting 602 is referred to by the device management agent program 134 when a path for the saving destination is set in the storage 153 upon saving of the driver file and the driver setting file and the driver file and the driver setting file are saved therein or when the saving path 407 of the driver management table 164 is updated.

FIG. 6 is a schematic diagram illustrating an example of system configuration of the remote operation system 1000 in the embodiment. The remote operation system shown in FIG. 6 includes a data server 201 in addition to the client 101 and the information processing server 102 of FIG. 1.

The data server 201 has the hardware configuration similar to that of the client 101 shown in FIG. 1 though not shown, and includes an operating system (OS) and various applications. A plurality of driver files such as a driver B file 261 and a driver C file 262 are stored in a storage 254 included in the data server 201 in a correspondence relationship manner with driver setting files not shown.

Arrow 271 represents a data flow when the driver A file 162 in the storage 152 of the client 101 is transmitted to be stored in the storage 153 of the information processing server 102 together with the driver A setting file 163 not shown in case where there is no driver A file 162 in the storage 153 of the information processing server 102.

Arrow 272 represents a data flow when the driver B file 261 in the storage 254 of the data server 201 is down-loaded into the storage 153 of the information processing server 102 together with the driver B setting file not shown in case where there is no driver B file 261 in the storage 153 of the information processing server 102.

Figure 7:
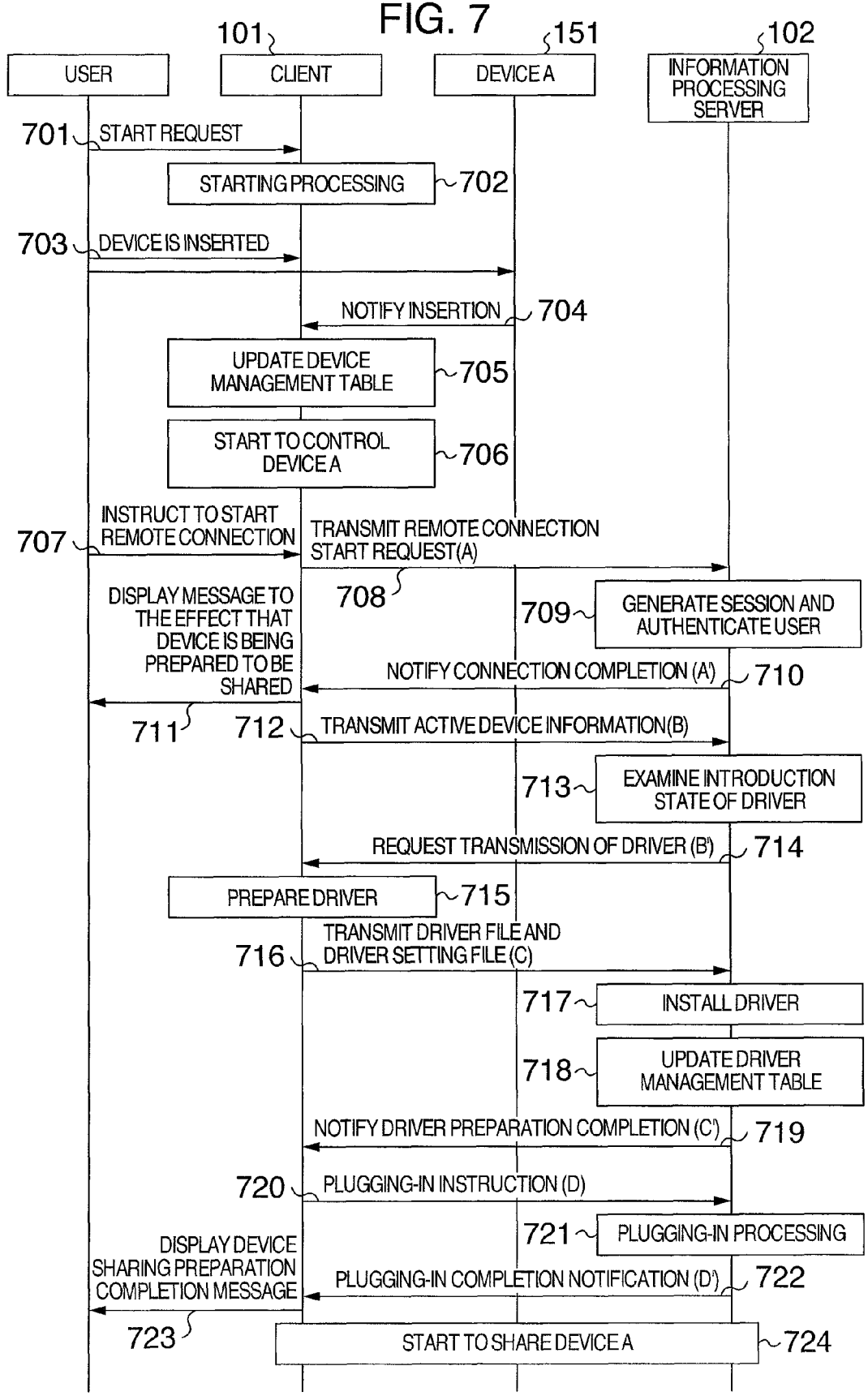
FIG. 7 is a flowchart showing an example of the processing operation of the whole system until the device can be directly utilized from the information processing server after the user starts the client to connect it to the information processing server.

FIG. 7 is a flowchart showing an example of the processing operation of the whole system until the user logs in the information processing server 102 and the user can utilize the device A 151 connected to the client 101 from the information processing server 102 after the user starts the client 101.

The user issues a start request to the client 101 (701). When the client 101 receives the start request from the user, the client 101 loads the operating system 121, the bus driver 123, the application program 120 and the client-side basic control program 141 of the device management manager program 125 into the memory 111 from the storage 152 and starts them (702).

Then, when the user inserts the device A 151 into the client 101 (703), the device A 151 outputs plugging-in data. The plugging-in data contains the identification information of the device A 151. When the bus driver 123 of the client 101 detects the insertion of the device A 151, the bus driver 123 instructs the operating system 121 to prepare for utilization of the device driver suited to the device A 151.

The instructed operating system 121 searches for a location of the driver A file 162 on the basis of information registered in the registry of the operating system 121 and when the driver A file 162 is detected, the operating system 121 loads the driver A file 162 into the memory 111. Thereafter, the driver A file 162 acts as the driver A 122.

On the other hand, the filter driver 143 is also loaded into the memory 111 through the similar processing to that of the driver A 122. When the driver A 122 and the filter driver 143 are loaded into the memory 111, the filter driver 143 performs transmission and reception of the plugging-in data for making the operating system 121 recognize the device A 151 between the operating system 121 and the device A 151. The filter driver 143 filters data transmitted from the operating system 121 through the driver A 122 and the bus driver 123 to the device A 151 to thereby make monitoring and preserves the plugging-in data for making the operating system 121 recognize the device into the filter driver 143.

The plugging-in data is used when the information processing server 102 carries out the plugging-in processing in step 721 described later. Further, the filter driver 143 notifies the client-side basic control program 141 that the device A 151 is connected (hereinafter also referred to as notification of plugging-in). In the notification, the device identification information of the device A 151 such as the vendor ID, the product ID and the serial number thereof is also notified (704). Further, the identification information of the driver A 122 such as the name and the version thereof may be notified.

On the other hand, the client-side basic control program 141 which has received the notification of plugging-in updates the information of the active 307 for the line of the corresponding device in the device management table 161 to "Yes" on the basis of the device identification information of the received device A 151 such as the vendor ID, the product ID and the serial number thereof or the identification information of the driver A 122 (705).

Thus, the device A 151 becomes the state that it can be used from the client 101 (706).

Next, when the user instructs the client 101 to start the remote connection (707), the client 101 transmits a remote connection start request to the information processing server 102 (708). The instruction for starting the remote connection corresponds to inputting of the user's ID and password and the information processing server 102 which has received the remote connection start request generates the session and authenticates the user (709). Then, the information processing server 102 transmits connection completion notification to the client 101 (710).

When the client 101 receives the connection completion notification, the client control program 124 displays a message to the effect that the device is being prepared to be shared to notify it to the user (711) and transmits active device information to the information processing server 102 (712) when there is any active device in the client 101. The information processing server 102 which has received the active device information examines the introduction state of the driver corresponding to the device (713) and when there is no driver file having the same name in the information processing server 102 or when the version thereof is different from that of the driver A 122 of the client 101 even if the driver is already introduced, the information processing server 102 requests the client 101 to transmit the driver (714). The client 101 which has received the transmission request of driver prepares the driver (715) and transmits the driver A file 162 and the driver A setting file 163 stored in the storage 152 to the information processing server 102 (716). The path in which the files exist is acquired by referring to the driver file path 304 and the setting file path 306 in the device management table 161.

The processing operations in steps 714 to 716 may be performed by requesting the data server 201 shown in FIG. 6 to transmit the driver and receiving the relevant driver file and driver setting file from the data server 201.

When the driver A file 162 and the driver A setting file 163 are received, the device management agent program 134 performs installation processing of the driver A 132 using the received driver A file 162 and driver A setting file 163 (717).

When the installation processing is completed, the device management agent program 134 updates the driver management table 164 (718).

The contents of the driver management table 164 for the vendor ID 401, the product ID 402, the driver file name 403, the version 404 and the setting file name 405 are updated on the basis of the active device information received in step 712. However, the path parts described before the file name of the driver file name 403 and the setting file name 405 are deleted and the driver file name 403 and the setting file name 405 are then stored. Further, the introduction state 406 is updated to "in remote introduction" and the remote utilization 408 is updated to "Yes".

When the driver A 132 having the same function including the version as the driver A 122 is already introduced in the information processing server 102, the processing operations in steps 713 to 717 are not performed, though only update of the remote utilization 408 to "Yes" in step 718 is implemented.

Next, the information processing server 102 transmits driver preparation completion notification to the client 101 (719). The client 101 which has received the driver preparation completion notification issues a plugging-in instruction of the device A 151 which is active to the information processing server 102 (720). When the plugging-in instruction is issued (720), plugging-in data is also transmitted from the client 101 to the information processing server 102. The information processing server 102 which has received the plugging-in instruction carries out the plugging-in processing (721).

The plugging-in processing is to reproduce the same procedure as that in the case where the device A 151 is directly inserted into the information processing server 102 among the device management agent program 134, the operating system 131 and the driver A 132. The pseudo-bus driver 147 gives a spurious response of plugging-in data to the driver A 132, so that the information processing server 102 recognizes the device virtually.

When a request is issued to the device A 151 from the operating system 131 or the application program 130 of the information processing server 102 after the information processing server 102 recognizes the device virtually, the pseudo-bus driver 147 of the information processing server 102 transmits a request to the filter driver 143 of the client 101 through the network 1100.

The filter driver 143 of the client 101 processes the received request in the device A 151 and a response that is its processing result is transmitted to the pseudo-bus driver 147 of the information processing server 102.

The filter driver 143 of the client 101 exclusively controls the request from the operating system 121 and the application program 120 of the client 101 and the request from the operating system 131 and the application program 130 of the information processing server 102. The exclusive control can be made by synchronizing with the requests by means of the semaphore or the like, for example.

The pseudo-bus driver 147 returns the response received from the filter driver 143 of the client 101 to the operating system 131 and the application program 130 of the information processing server 102. Consequently, the device A 151 connected to the client 101 can be accessed from the operating system 131 and the application program 130 of the information processing server 102.

After completion of the plugging-in processing, plugging-in completion notification is transmitted from the information processing server 102 to the client 101 (722) and the client control program 124 displays a message to the effect that the device sharing preparation is completed to notify it to the user (723).

By the above-mentioned processing, the device management manager program 125 and the device management agent program 134 can communicate with each other, so that the device A 151 can be operated in the same manner as the case where the device A 151 is directly connected to the information processing server 102, that is, sharing of the device A 151 is started (724).

Further, detailed processing operations performed by the device management manager program 125 and the device management agent program 134 in FIG. 7 will be described later with reference to FIGS. 9 to 16.

Figure 8:
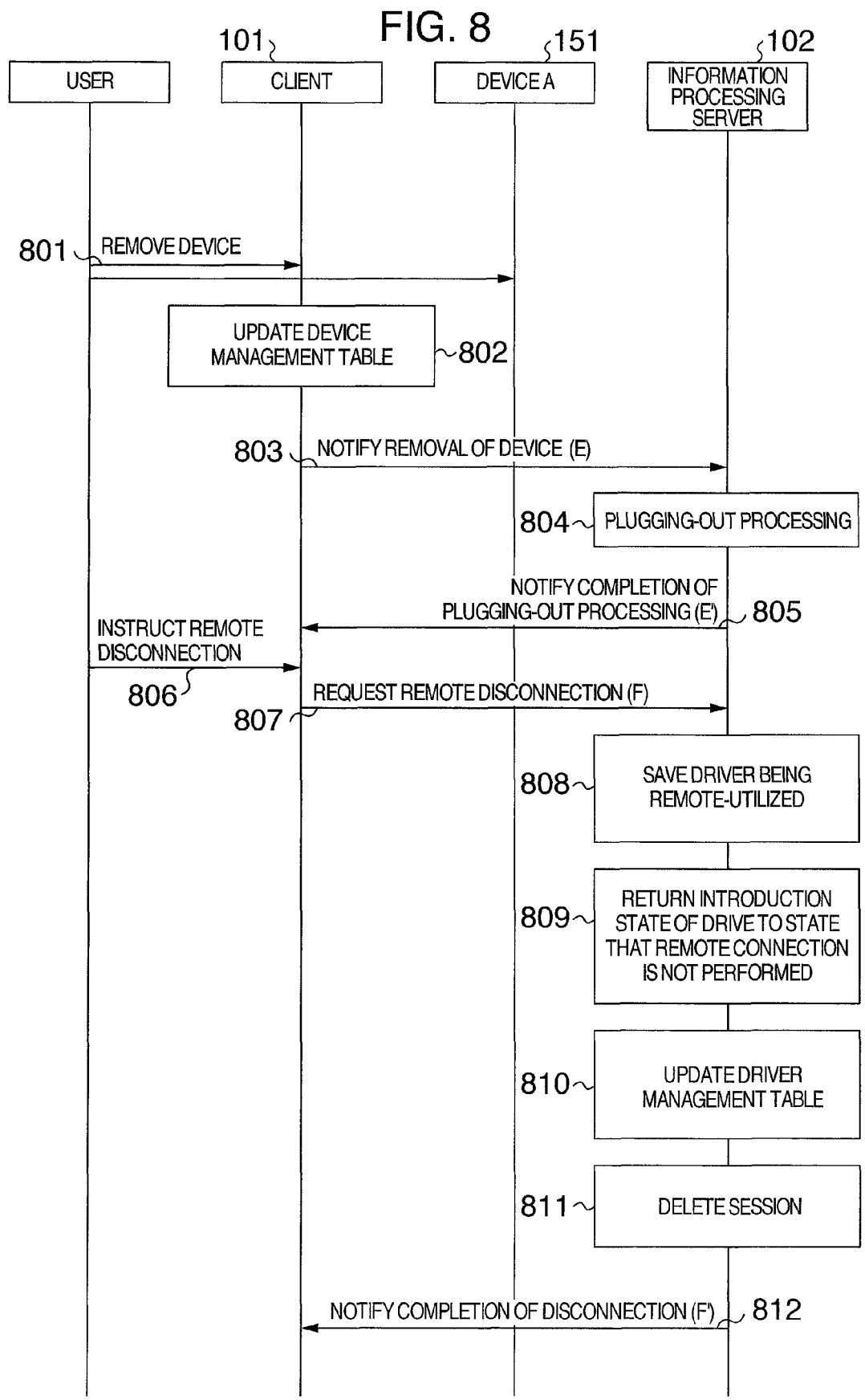
FIG. 8 is a flowchart showing an example of the processing operation of the whole system until the user plugs out the device to end operation of the information processing server from the client after the device is shared with the client and the information processing server.

FIG. 8 is a flowchart showing an example of the processing operation of the whole system until the user removes the device A 151 and ends operation of the information processing server 102 from the client 101 after the device A 151 is shared with the client 101 and the information processing server 102.

When the user removes the device A 151 (801), the operating system 121 detects the removal and notifies it to the device management manager program 125.

The device management manager program 125 updates the device management table 161 on the basis of the notified information (802). Then, the client 101 notifies the removal of the device to the information processing server 102 (803) and the information processing server 102 which has received the notification carries out the plugging-out processing (804).

The plugging-out processing is to reproduce the same procedure as that in the case where the device A 151 is disconnected from the information processing server 102 to which the device A 151 is directly connected among the device management agent program 134, the operating system 131 and the driver A 132. The pseudo-bus driver 147 gives a spurious response of plugging-in data to the driver A 132, so that the information processing server 102 recognizes removal of the device virtually.

Consequently, the device A 151 becomes the state that the it is removed from the information processing server 102, so that the application program 130 of the information processing server 102 cannot access the device A 151 connected to the client 101 until the plugging-in processing is performed again. When the plugging-out processing is completed, the information processing server 102 notifies the client 1 that the plugging-out processing is completed (805).

Next, when the user instructs the client 101 to disconnect or cut off connection with the information processing server 102 (806), the client 101 transmits a remote disconnection request (service utilization end notification) to the information processing server 102 (807). The device management agent program 134 of the information processing server 102 which has received the remote disconnection request saves the driver A 132 being remote-utilized into the storage 153 (808) and returns the introduction state of the device A 151 to the state that the remote connection is not performed (809).

After the above-mentioned processing is completed, the device management agent program 134 updates the driver management table 164 (810), deletes the session (811) and notifies the client 101 that the disconnection is completed (812). Further, when the terminal utilization setting 601 of the device driver management setting table 168 is not set to "shared", the processing operations in steps 808 and 809 are not performed and the driver A 132 installed in step 717 is left as it is.

Further, detailed processing operations performed by the device management manager program 125 and the device management agent program 134 will be described later with reference to FIGS. 9 to 16.

Figure 9:
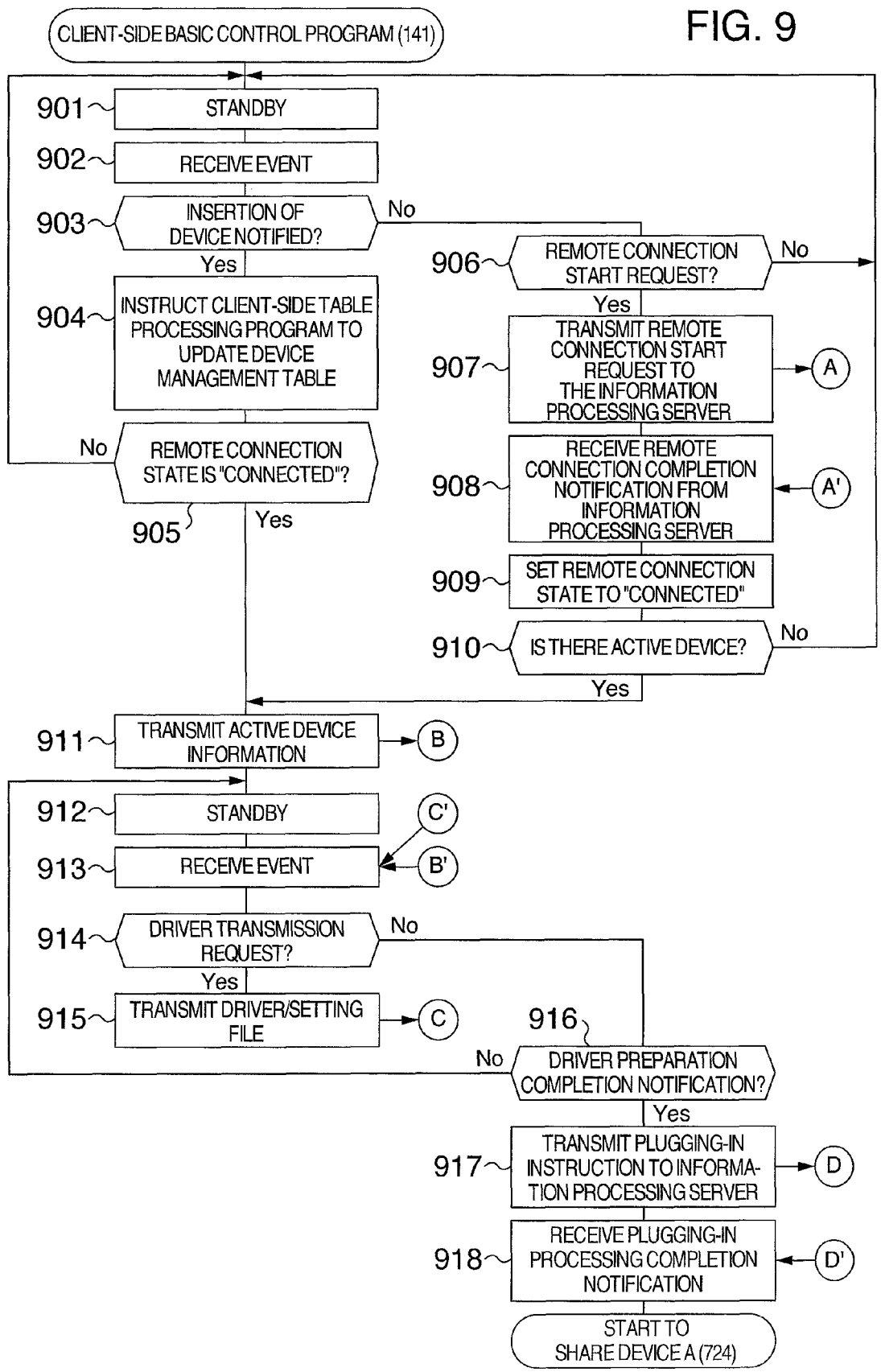
FIG. 9 is a flowchart showing an example of the processing operation from plugging in of the device until sharing of the device is started, performed by a basic control program of a device management manager in the client.

FIG. 9 is a flowchart showing an example of the processing operation from connection of the device A 151 to start of sharing of the device A 151, performed by the client-side basic control program 141 of the device management manager program 125 in the client 101.

Figure 10:
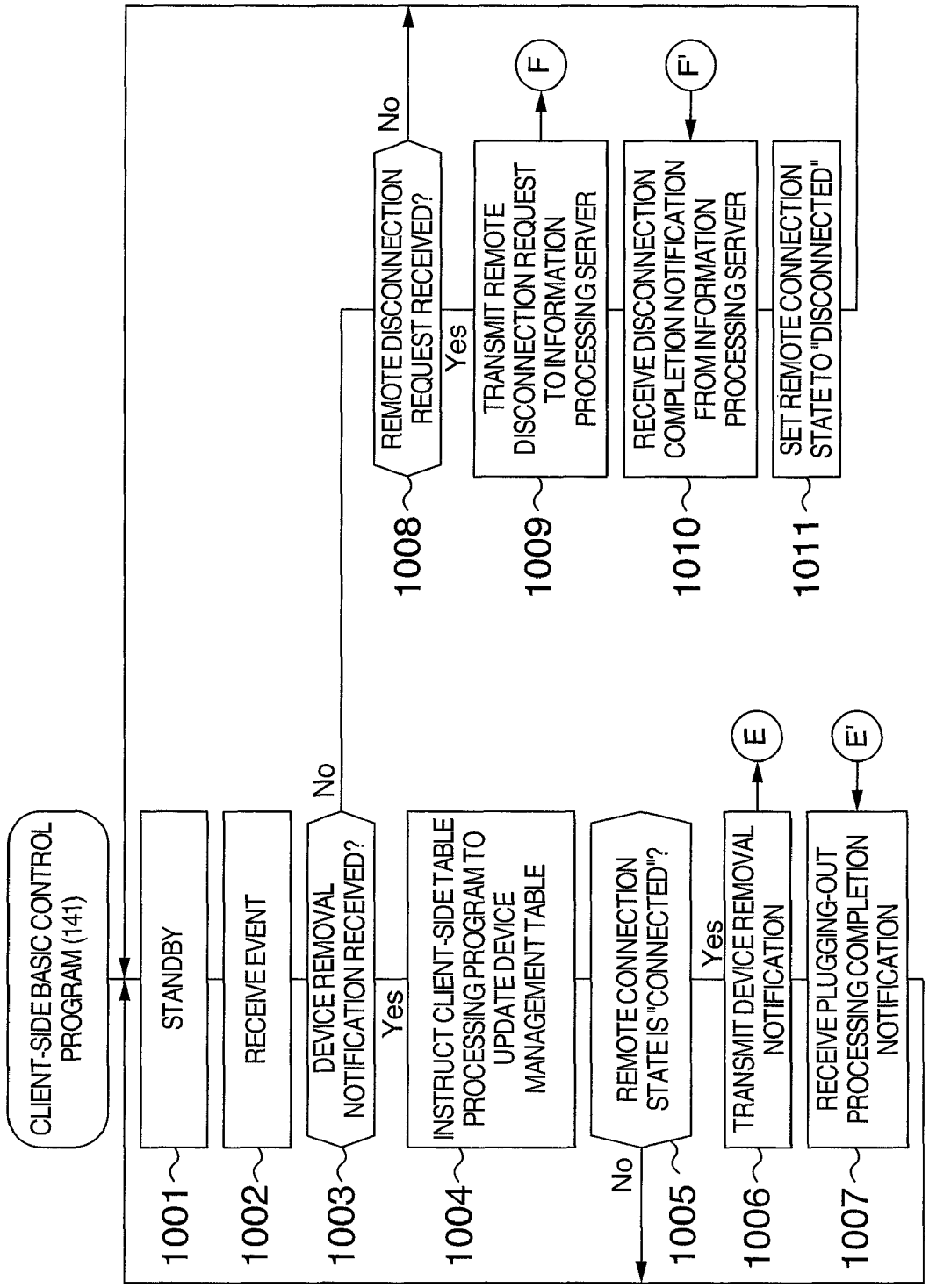
FIG. 10 is a flowchart showing an example of the processing operation until remote disconnection after sharing of the device, performed by the basic control program of the device management manager in the client.

In FIGS. 9 and 10, circled alphabets represent output supplied to the information processing server 102 or input produced from the information processing server 102 and correspond to output or input represented by the same circled alphabets as those described in other drawings.

The client-side basic control program 141 is on standby (901) until it receives an event (902) after started.

When the client-side basic control program 141 receives notification that the device A 151 is inserted from the filter driver 143 (903-Yes), the client-side basic control program 141 instructs the client-side table processing program 142 to update the information of the active 307 in the device management table 161 corresponding to the vendor ID 301, the product ID 302 and the serial number 303 of the identification information of the device A 151 received together with the insertion notification to "Yes" (904).

The client-side basic control program 141 becomes on standby 901 again when the remote connection state 501 in the network connection state buffer 167 is not "connected" (905-No).

Further, when the client-side basic control program 141 receives the remote connection start request from the user (906-Yes), the client-side basic control program 141 transmits the remote connection start request to the information processing server 102 (907). Moreover, when the client-side basic control program 141 receives the connection completion notification from the information processing server 102 (908), the client-side basic control program 141 updates the remote connection state 501 to "connected" (909).

It is examined whether there is any active device in the client 101 or not by referring to the active 307 in the device management table 161 and when there is any active device (910-Yes), the client-side basic control program 141 transmits the active device information to the information processing server 102 (911) and becomes on standby (912) until any event is received (913).

When the client-side basic control program 141 receives the driver transmission request (914-Yes), the client-side basic control program transmits the driver A file 162 and the driver A setting file 163 to the information processing server 102 (915). Locations of the files to be transmitted are specified by referring to the driver file path 304 and the setting file path 306 of the device management table 161.

The client-side basic control program 141 transmits the plugging-in instruction to the information processing server 102 (917) when the driver preparation completion notification is received (916-Yes).

When the client-side basic control program 141 receives the plugging-in processing completion notification from the information processing server 102 (918), the sharing preparation of the device A 151 is completed and sharing of the device A 151 is started (724).

FIG. 10 is a flowchart showing an example of the processing operation until the remote disconnection after sharing of the device A 151 performed by the client-side basic control program 141 of the device management manager program 125 in the client 101.

When the client-side basic control program 141 receives an event of removal notification of the device A 151 from the filter driver 143 (1002, 1003-Yes while being on standby (1001), the client-side basic control program 141 instructs the client-side table processing program 142 to update the information of the active 307 in the device management table 161 corresponding to the vendor ID 301, the product ID 302 and the serial number 303 of the identification information of the device A 151 received together with the device removal notification to "No" (1004).

The client-side basic control program 141 transmits the device removal notification to the information processing server 102 (1006) when the remote connection state 501 is set to "connected" (1005-Yes).

When the client-side basic control program 141 receives the plugging-out processing completion notification from the information-processing-server-side basic control program 144 (1007), the client-side basic control program 141 is returned to the standby state again.

When the client-side basic control program 141 receives an event of the remote disconnection request (1002, 1008-Yes), the client-side basic control program 141 transmits the remote disconnection request to the information processing server 102 (1009) and after the client-side basic control program 141 receives the disconnection completion notification from the information processing server (1010), the client-side basic control program sets the remote connection state to "disconnected" (1011).

Figure 11:
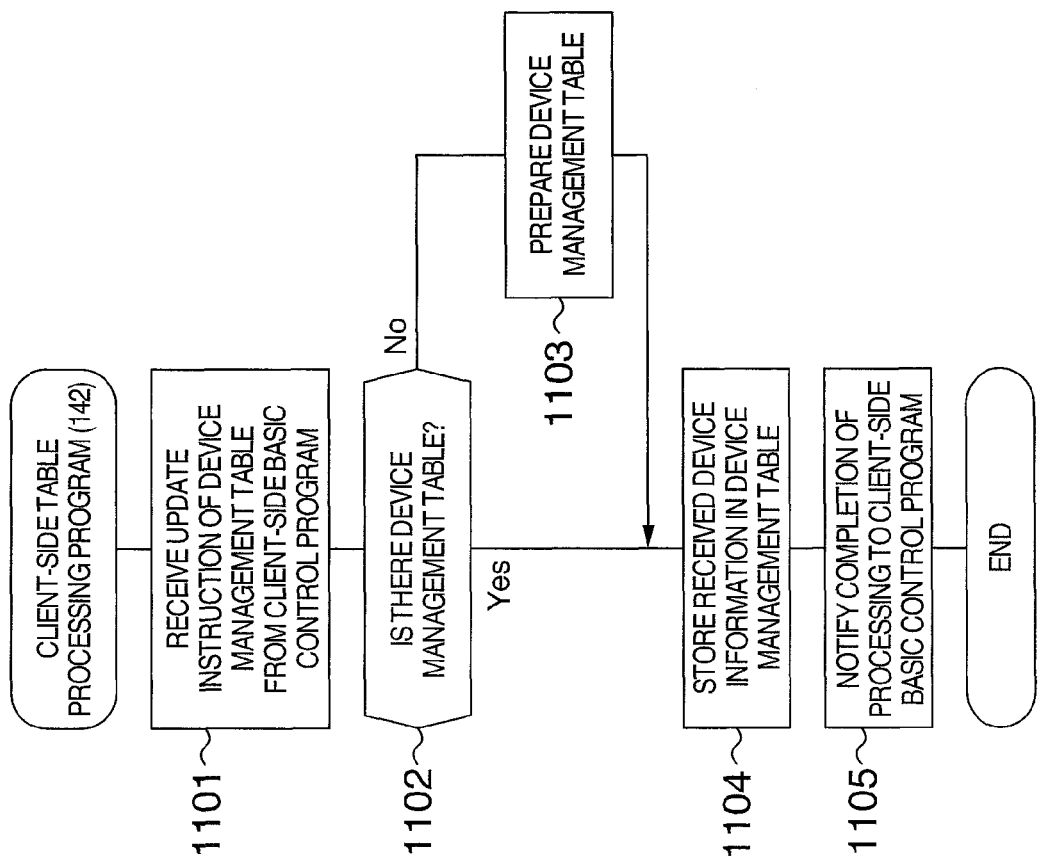
FIG. 11 is a flowchart showing an example of the processing operation performed by a table processing program of the device management manager in the client.

FIG. 11 is a flowchart showing an example of the processing operation performed by the client-side table processing program 142 of the device management manager program 125 in the client 101.

When the client-side table processing program 142 receives an update instruction of the device management table 161 from the client-side basic control program 141 (1101), the client-side table processing program 142 examines whether there is the device management table 161 or not (1102). When there is no device management table 161, the client-side table processing program 142 prepares the device management table 161 (1103).

Next, the client-side table processing program 142 updates information recorded in the device management table 161 for the device specified by the device specifying information received from the client-side basic control program 141 (1104). When the client-side table processing program 142 completes the processing, the client-side table processing program 142 notifies the completion to the client-side basic control program 141 (1105).

Figure 12:
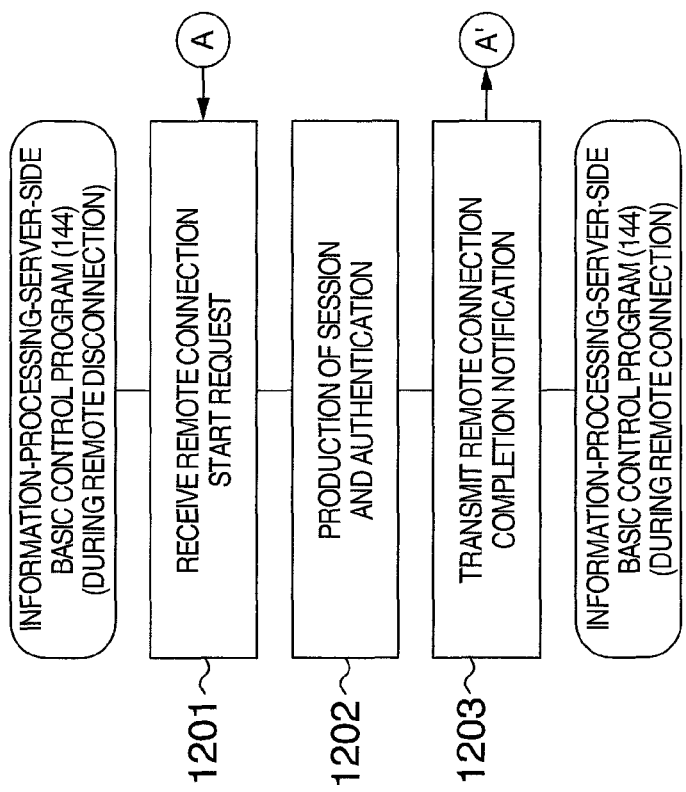
FIG. 12 is a flowchart showing an example of the processing flow in remote connection performed by a basic control program of a device management agent in the information processing server.

FIG. 12 is a flowchart showing an example of the processing operation in remote connection performed by the information-processing-server-side basic control program 144 of the device management agent program 134 in the information processing server 102.

Figure 13:
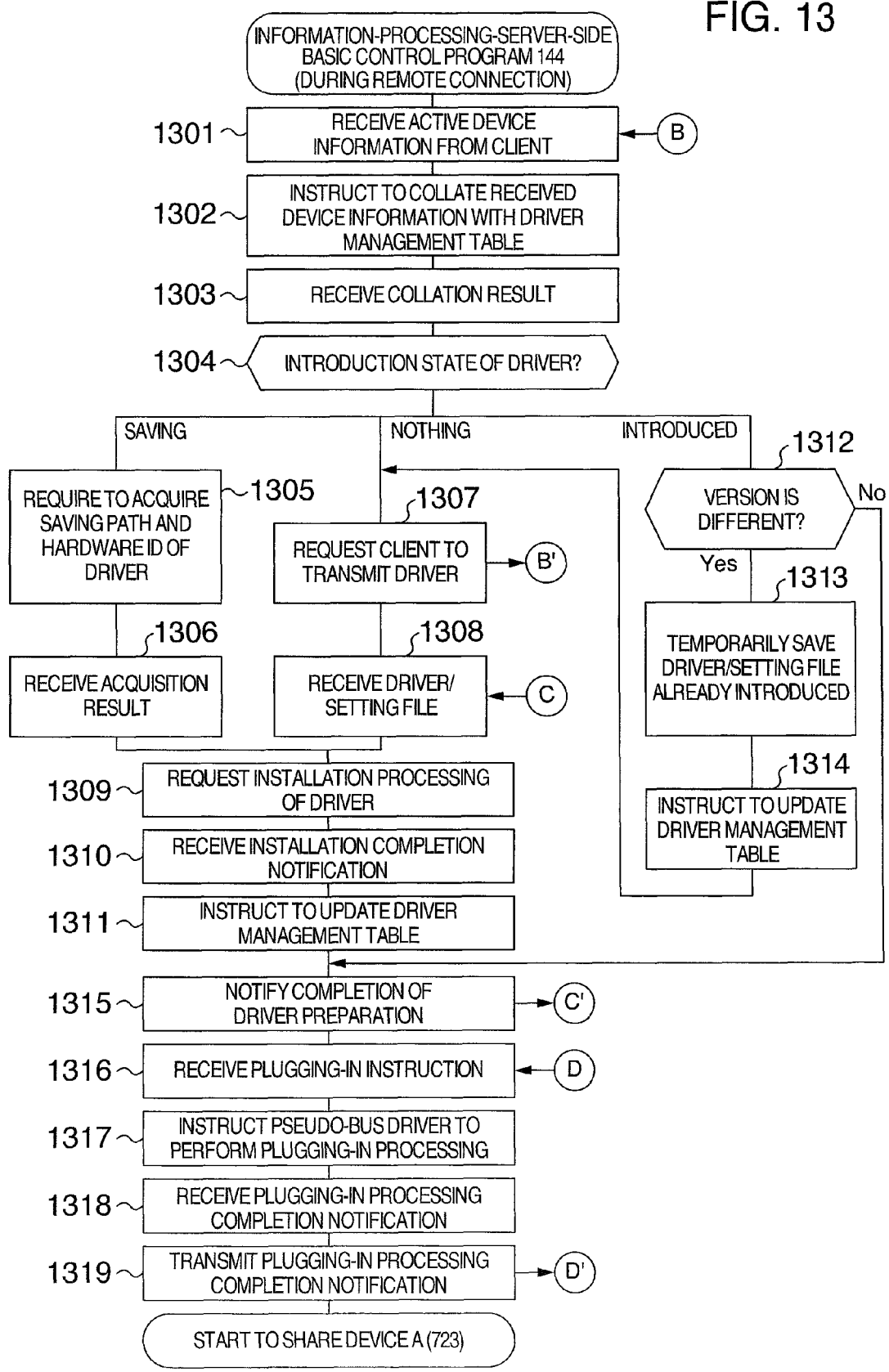
FIG. 13 is a flowchart showing an example of the processing operation until sharing of the device is started after remote connection, performed by the basis control program of the device management agent in the information processing server.
Figure 14:
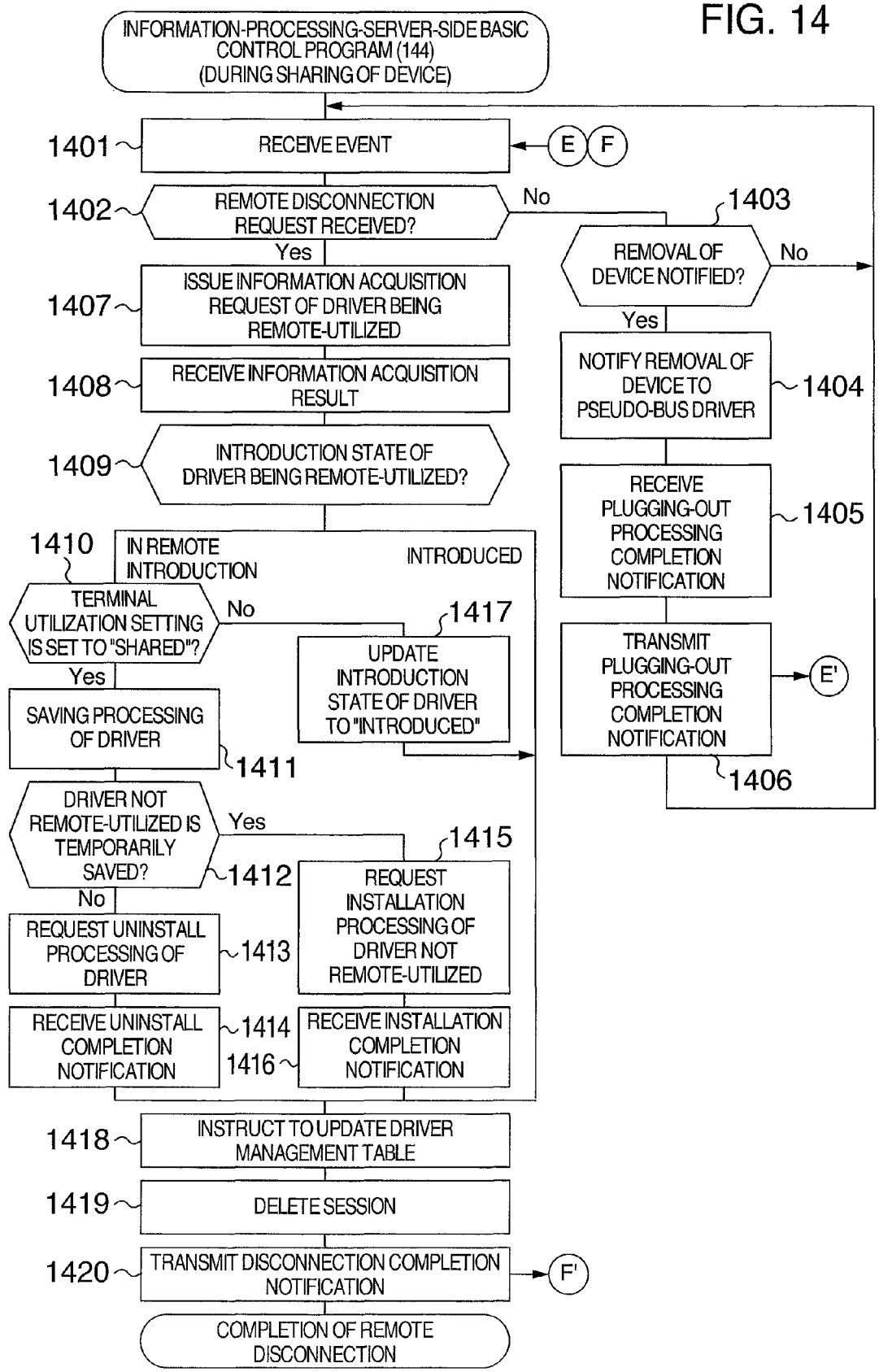
FIG. 14 is a flowchart showing an example of the processing operation until remote disconnection after sharing of the device, performed by the basis control program of the device management agent in the information processing server.

In FIGS. 12 to 14, circled alphabets represent output supplied to the client 101 or input produced from the client 101 and correspond to output or input represented by the same circled alphabets as those described in other drawings.

When the information-processing-server-side basic control program 144 receives the remote connection start request from the client 101 during the remote disconnection (1201), the information-processing-server-side basic control program 144 performs production of session and authentication (1202) and when the processing is ended, the informationprocessing-server-side basic control program 144 transmits remote connection completion notification to the client 101 (1203).

FIG. 13 is a flowchart showing an example of the processing operation until sharing of the device A 151 is started after the remote connection performed by the information-processing-server-side basic control program 144 of the device management agent program 134 in the information processing server 102.

When the information-processing-server-side basic control program 144 receives the active device information from the client 101 during the remote connection (1301), the information-processing-server-side basic control program 144 instructs the information-processing-server-side table processing program 145 to collate the received active device information with the driver management table 164 (1302).

At this time, the information-processing-server-side basic control program 144 transmits information of the vendor ID 301 and the product ID 302 of the device to the information-processing-server-side table processing program 145 and receives the introduction state 406 and the version 404 of the driver corresponding to the device A 132 identified by the vendor ID 301 and the product ID 302 as collation result from the information-processing-server-side table processing program 145 (1303). The subsequent processing is then branched in accordance with the introduction state of the driver A 132 (1304).

First, when the introduction state is "saving", it is not necessary to transmit the driver. However, since it is necessary to install the driver, the information-processing-server-side basic control program 144 requires the information-processing-server-side table processing program 145 to acquire the saving path of the driver A 132.

The information-processing-server-side basic control program 144 acquires hardware ID of the driver A 132 from the entry described in the registry or the driver A setting file 166 (1305). The hardware ID is a series of identification characters of the device defined by the vendor thereof and used to suit the driver setting file to the device. The hardware ID is described in the driver setting file and the hardware ID corresponds to the device in one-to-one correspondence manner, so that the driver setting file corresponds to the device through the hardware ID.

When the information-processing-server-side basic control program 144 receives the acquisition result (1306), the information-processing-server-side basic control program 144 requests the install/uninstall processing program 146 to perform the installation processing of the driver A 132 using the saving path and the hardware ID acquired of the driver A 131 as input information (1309).

When the information-processing-server-side basic control program 144 receives installation completion notification from the install/uninstall processing program 146 (1310), the information-processing-server-side basic control program 144 instructs the information-processing-server-side table processing program 145 to update the introduction state 406 of the driver A 132 in the driver management table 164 to "in remote introduction" (1311).

In step 1304, when the introduction state 406 is set to "nothing", the information-processing-server-side basic control program 144 requests the client 101 to transmit the driver A file 162 and the driver A setting file 163 corresponding to the driver A 122 (1307).

When the information-processing-server-side basic control program 144 receives the driver A file 162 and the driver A setting file 163 from the client 101 (1308), the information-processing-server-side basic control program 144 acquires the hardware ID of the driver A 122 from the entry described in the registry or the driver A setting file 166 and requests the install/uninstall processing program 146 to perform the installation processing of the driver A 122 (1309). The processing operations in steps 1310 and 1311 are performed in the same manner as the case where the introduction state is "saving".

Next, in step 1304, when the introduction state 406 is set to "introduced", the information-processing-server-side basic control program 144 compares the version 305 of the driver A 122 in the client 101 received in step 1301 with the version 404 received in step 1303 (1312).

As a result of the comparison, when the versions are different (1312-Yes), the information-processing-server-side basic control program 144 temporarily saves the driver A file 165 and the driver A setting file 166 corresponding to the driver A 132 already installed (1313). The temporary saving destination path is, for example, a combination of the path of the saving path setting 602 and the user ID of the user being in the remote connection currently.

Then, the information-processing-server-side basic control program 144 instructs the information-processing-server-side table processing program 145 to update the introduction state 406 of the temporarily saved driver to "temporary saving" and the saving path 407 to the information in the temporary saving destination path in the driver management table 164 (1314). Thereafter, there are performed the same processing operations as those in steps 1307 to 1311 in case where the introduction state 406 is set to "nothing".

As a result of the comparison in step 1312, when the versions are identical (1312-No), the transmission/reception processing of the driver and the installation processing are not performed.

By the above-mentioned processing, when preparation of the driver A 132 (or driver A 122) on the side of the information processing server 102 is completed, the information-processing-server-side basic control program 144 notifies the client 101 that the preparation of the driver is completed (1315). Thereafter, when the information-processing-server-side basic control program 144 receives the plugging-in instruction from the client 101 (1316), the information-processing-server-side basic control program 144 instructs the pseudo-bus driver 147 to perform the plugging-in processing (1317).

When the information-processing-server-side basic control program 144 receives the completion notification of the plugging-in processing from the pseudo-bus driver 147 (1318), the information-processing-server-side basic control program 144 transmits the plugging-in processing completion notification to the client 101 (1319).

By the above-mentioned processing, the sharing preparation of the device A 151 is completed and sharing of the device A 151 is started (723).

FIG. 14 is a flowchart showing an example of the processing operation until the remote disconnection after sharing of the device A 151 performed by the information-processing-server-side basic control program 144 of the device management agent program 134 in the information processing server 102.

When the information-processing-server-side basic control program 144 receives the device removal notification from the client 101 (1403-Yes), the information-processing-server-side basic control program 144 notifies removal of device to the pseudo-bus driver 147 (1404). When the information-processing-server-side basic control program 144 receives the plugging-out processing completion notification from the pseudo-bus driver 147 (1405), the information-processing-server-side basic control program 144 transmits the plugging-out processing completion notification to the client 101 (1406).

Further, when the information-processing-server-side basic control program 144 receives the remote disconnection request from the client 101 (1402-Yes), the information-processing-server-side basic control program 144 issues the information acquisition request of the driver being remote-utilized to the information-processing-server-side table processing program 145 (1407). When the information-processing-server-side basic control program 144 receives the information acquisition result from the information-processing-server-side table processing program 145 (1408), the subsequent processing is branched in accordance with the introduction state of the driver A 132 being remote-utilized (1409).

When the introduction state is set to "in remote introduction", the information-processing-server-side basic control program 144 examines whether the terminal utilization setting 601 is set to "shared" or not. When it is set to "shared" (1410-Yes), the information-processing-server-side basic control program 144 performs the saving processing of the driver A 132 being remote-utilized (1411). The saving processing of the driver means that the driver A file 165 and the driver A setting file 166 corresponding to the driver A 132 are copied to the saving destination path in the storage 153. Further, the saving destination path of the files is the information set in the saving path setting 602.

When the driver which is not remote-utilized is not temporarily saved, that is, when the driver A 132 is not introduced before remote connection (1412-No), the information-processing-server-side basic control program 144 requests the install/uninstall processing program 146 to perform an uninstall processing of the driver A 132 being remote-utilized (1413) and receives uninstall completion notification after completion of the uninstall processing (1414).

Thereafter, the information-processing-server-side basic control program 144 instructs the information-processing-server-side table processing program 145 to update the introduction state 406, the saving path 407 and the remote utilization 408 in the driver management table 164 of the driver A 132 being remote-utilized to respective current states (1418).

On the other hand, when the driver which is not remote-utilized (this driver is provisionally described as the driver A 132a) is temporarily saved, that is, when the driver A 132 is already introduced before remote utilization but has a different version 305 (1412-Yes), the information-processing-server-side basic control program 144 requests the install/uninstall processing program 146 to perform the install processing of the driver A 132a which is already installed before remote connection and is temporarily saved currently (1415). After completion of the install processing, the information-processing-server-side basic control program 144 receives installation completion notification (1416).

Thereafter, the information-processing-server-side basic control program 144 instructs the information-processing-server-side table processing program 145 to update the introduction state 406, the saving path 407 and the remote utilization 408 in the driver management table 164 of the driver A 132 being remote-utilized and the driver A 132a being temporarily saved to respective current states (1418).

In step 1410, when the terminal utilization setting 601 is set to "exclusive" (1410-No), the information-processing-server-side basic control program 144 instructs the information-processing-server-side table processing program 145 to update the introduction state 406 in the driver management table 164 of the driver A 132 being remote-utilized to "introduce" (1417, 1418).

In step 1409, when the introduction state is set to "introduced", the information-processing-server-side basic control program 144 instructs the information-processing-server-side table processing program 145 to update the remote utilization 408 in the driver management table 164 corresponding to the driver A 132 being remote-utilized to "No" (1417, 1418).

When the processing until step 1418 is completed, the information-processing-server-side basic control program 144 deletes the session (1419) and transmits disconnection completion notification to the client 101 (1420). As described above, the remote disconnection processing is completed.

Figure 15:
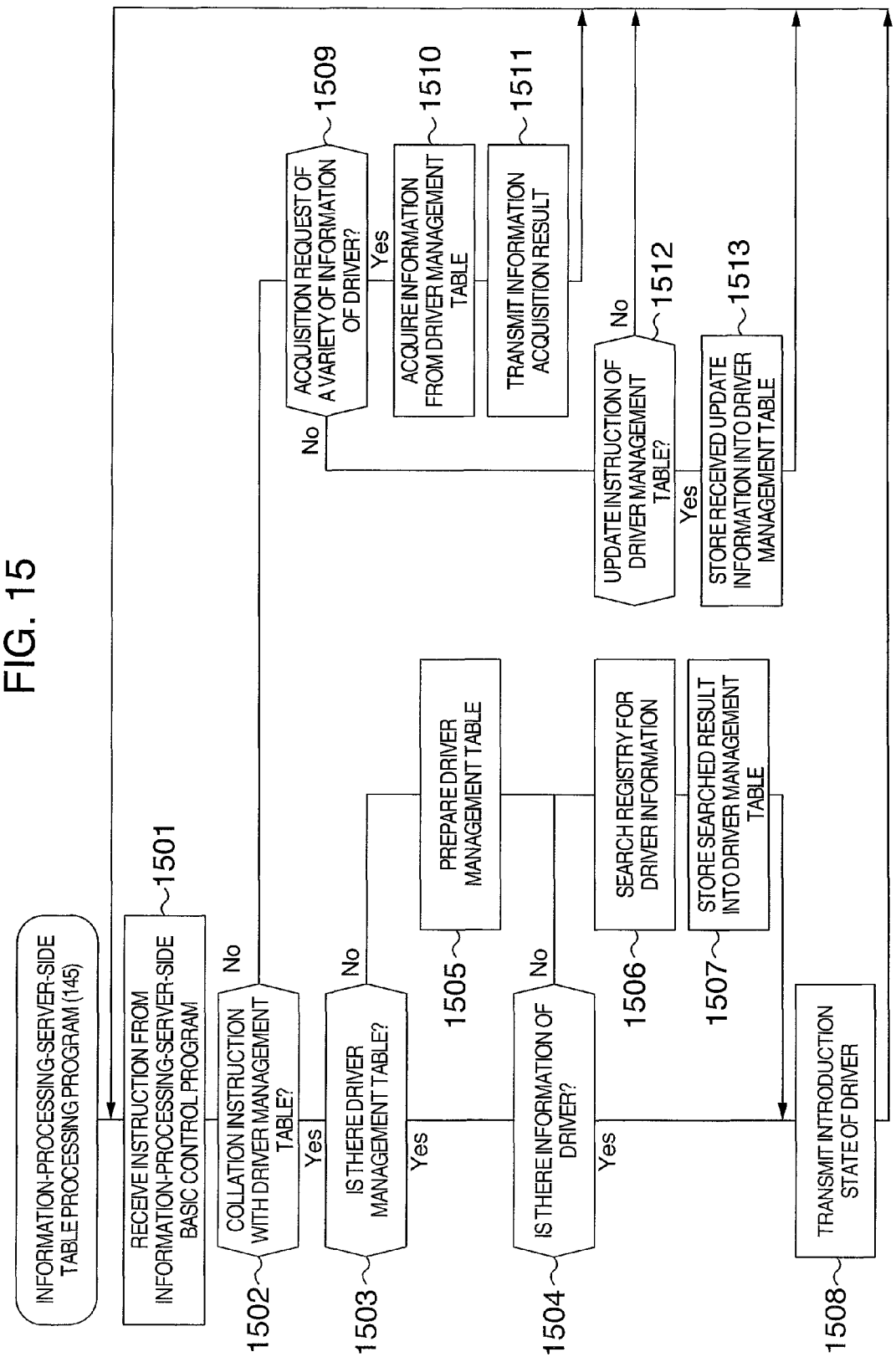
FIG. 15 is a flowchart showing an example of the processing operation performed by the table processing program of the device management agent in the information processing server.

FIG. 15 is a flowchart showing an example of the processing operation performed by the information-processing-server-side table processing program 145 of the device management agent program 134 in the information processing server 102.

When the information-processing-server-side table processing program 145 receives the instruction from the information-processing-server-side basic control program 144 (1501), the information-processing-server-side table processing program 145 performs the following processing in accordance with the contents of the instruction.

When the information-processing-server-side table processing program 145 receives collation instruction with the driver management table 164 from the information-processing-server-side basic control program 144 (1502-Yes), the information-processing-server-side table processing program 145 also receives information of the vendor ID and the product ID of the device simultaneously with the instruction. The information-processing-server-side table processing program 145 examines whether there is the driver management table 164 or not (1503), and when there is no driver management table 164, the information-processing-server-side table processing program 145 prepares the driver management table 164 (1505).

Further, when there is the driver management table 164 (1503-Yes), the information-processing-server-side table processing program 145 examines whether the information of the driver corresponding to the device identified by the vendor ID and the product ID received from the information-processing-server-side basic control program 144 is contained in the driver management table 164 or not (1504). When it is not contained in the driver management table 164, the information-processing-server-side table processing program 145 transmits the introduction state 406 of the driver corresponding thereto to the information-processing-server-side basic control program 144 (1508).

When the information of the driver corresponding to the device identified by the vendor ID and the product ID received from the information-processing-server-side basic control product 144 is not contained in the driver management table 164 (1504-No) or after the driver management table 164 is prepared in step 1505, the information-processing-server-side table processing program 145 searches the registry of the operating system 131 for the information of the driver corresponding to the device identified by the vendor ID and the product ID (1506). After completion of the search, the information-processing-server-side table processing program 145 stores the searched result into the driver management table 164 (1507).

At this time, for example, when the driver A 132 corresponding to the device identified by the vendor ID and the product ID received from the information-processing-serverside basic control program 144 has been installed, the information-processing-server-side table processing program 145 stores the information received from the information-processing-server-side basic control program 144 for the vendor ID and the product ID as it is and stores the information acquired from the registry for the driver file name 403 and the setting file name 405. For the version 404, information acquired by executing the application program interface (API) to the driver A file 165 that is the file of the driver A 132 is stored. In this case, "introduced" is stored or set in the introduction state 406 and "No" is stored or set in the remote utilization 408.

As a result of step 1506, when the corresponding driver is not installed, the information-processing-server-side table processing program 145 stores the information received from the information-processing-server-side basic control program 144 into the vendor ID 401 and the product ID 402 as it is and stores "nothing" into the introduction state 406 in step 1507. Anything is not stored into other items.

After step 1507, the information-processing-server-side table processing program 145 transmits the introduction state 406 and the version 404 of the driver corresponding to the device identified by the vendor ID and the product ID received from the information-processing-server-side basic control program 144 to the information-processing-server-side basic control program 144 as the collation result (1508).

Next, when the information-processing-server-side table processing program 145 receives the acquisition request of a variety of information of the driver from the information-processing-server-side basic control program 144 (1509-Yes), the information-processing-server-side table processing program 145 acquires the requested information from the driver management table 164 (1510) and transmits its result to the information-processing-server-side basic control program 144 (1511).

Further, when the information-processing-server-side table processing program 145 receives the update instruction of the driver management table 164 from the information-processing-server-side basic control program 144 (1512-Yes), the information-processing-server-side table processing program 145 stores the received update instruction in the driver introduction table 164 (1513).

Figure 16:
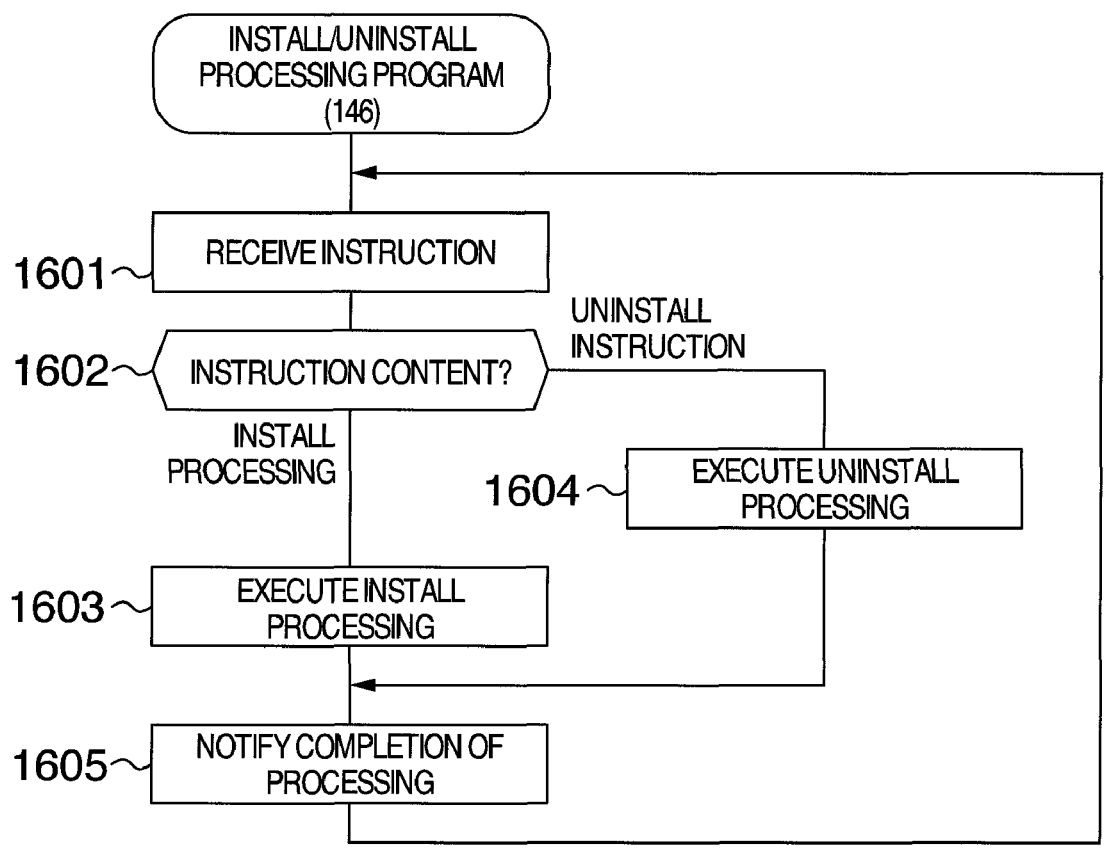
FIG. 16 is a flowchart showing an example of the processing operation performed by an install/uninstall processing program of the device management agent in the information processing server.

FIG. 16 is a flowchart showing an example of the processing operation performed by the install/uninstall processing program 146 of the device management agent program 134 in the information processing server 102.

When the install/uninstall processing program 146 receives an instruction from the information-processing-server-side basic control program 144 (1601), the install/uninstall processing program 146 executes the installation processing when the content of the instruction indicates the install processing and the install/uninstall processing program 146 executes the uninstall processing when the content of the instruction indicates the uninstall processing (1602, 1604). The processing operations executed in the respective cases are described below in detail.

When the instruction of the install processing is received, the install/uninstall processing program 146 receives the path of the driver file and the driver setting file of the driver to be installed and the hardware ID of the device corresponding to the driver simultaneously. The install/uninstall processing program 146 performs the install processing in accordance with the following procedure using the path and the hardware ID as input data.

First, the install/uninstall processing program 146 executes the API for acquiring the hardware ID from the registry to thereby examine whether the driver corresponding to the device suited to the hardware ID that is input data is already installed or not.

When the driver is already installed, the install/uninstall processing program 146 executes the API for installing a new driver corresponding to the device suited to the hardware ID to thereby over-install the driver, that is, install the driver over the already installed driver so that the driver file existing in the path that is input data is operated as the driver.

On the other hand, when the driver is not already installed, the install/uninstall processing program 146 executes the API for setting the property of plug and play (PnP) device, the API for registering a newly prepared device instance into PnP manager and the API for installing a new driver corresponding to the device suited to the hardware ID to thereby perform installation newly so that the driver file existing in the path that is input data is operated as the driver.

On the other hand, when the install/uninstall processing program 146 receives an uninstalling processing instruction from the information-processing-server-side basic control program 144, the install/uninstall processing program 146 receives the hardware ID of the device corresponding to the driver simultaneously. The install/uninstall processing program 146 performs the uninstalling processing in accordance with the following procedure using the hardware ID as input data.

First, the install/uninstall processing program 146 executes the API for acquiring the hardware ID from the registry to thereby examine whether the driver corresponding to the device suited to the hardware ID that is input data is already installed or not.

When the driver is not already installed, the install/uninstall processing program 146 returns an error to the effect that the uninstalling processing cannot be performed since the driver is not already installed to the information-processing-server-side basic control program 144.

When the driver is already installed, the install/uninstall processing program 146 executes the API to thereby uninstall the driver corresponding to the device suited to the hardware ID that is input data.

When the install or uninstall processing is completed, the install/uninstall processing program 146 notifies completion of the processing to the information-processing-server-side basic control program 144 (1605).

As described above, according to the remote operation system of the embodiment, the device connected to the client can be utilized from the information processing server in the same utilization environment as the case where the device is utilized from the client.

In the same manner as the case where the device is directly connected to the information processing server, the processing to the device connected to the client may be performed from the information processing server. For example, a printer connected to the client can be directly accessed from an application in the information processing server and accordingly data existing in the information processing server can be outputted to the printer connected to the client.

Further, even when a device driver of a device desired to be utilized is not installed in the information processing server, the device driver can be transmitted and installed automatically when it is desired to be utilized without making the user or the manager manually install the device driver in the information processing server to thereby lighten a user's or manager's burden upon operation of the system.

Further, in order to enable use of the device connected to the client from the information processing server side without requiring any other operation only by connecting the device in case where the device is connected to the client and the connected device is accessed from the information processing server, there may be provided on the client side the device management manager including the filter driver for exclusively controlling transmission and reception of data between the device connected to the client and the application of the client and transmission and reception of data between the device and the information processing server. And further, there may be provided on the information processing server side the device management agency including the pseudo-bus driver functioning as the bus driver virtually between communication means with the client and the application. Whereby, the processing to the device connected to the client can be performed from the information processing server in the same manner as the case where the device is directly connected to the information processing server.

Moreover, when the device connected to the client side is a special device requiring a device driver having the special function and the device is not utilized by the information processing server in the past, it is necessary to install the necessary device driver in the information processing serve.

Accordingly, there is provided a measure for transmitting the device driver existing in the client to the information processing server and installing the device driver automatically when it is detected that the user connects the device to the client but there is no device driver of the device in the information processing server. Further, in order to cope with even the case where it is necessary to restore the information processing server to the environment existing before utilization thereof after utilization of the information processing server is ended even if the information processing server is shared with a plurality of users, there is provided a measure for restoring the introduction state of the device driver in the information processing server.

Consequently, in the remote operation system, even when the client is a thin client and the actual processing operation is performed by the information processing server, data existing on the information processing server side can be outputted to a device such as a printer directly connected to the client and data can be outputted from a device such as an IC card reader directly connected to the client to the information processing server side. A device directly connected to the client can be directly controlled and utilized from an application on the information processing server side.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An information processing system including a service user apparatus to which a device is connected via a device interface and a service provider apparatus connected via a network to enable communication with the service user apparatus to receive input data inputted to the service user apparatus therefrom and execute information processing in accordance with the input data so that service of transmitting result of execution to the service user apparatus is provided, wherein the service user apparatus comprises:
   a CPU;
   a memory;
   a device driver stored into the memory, causing the CPU of the service user apparatus to output a command to the device when an operating system executed by the service user apparatus utilizes the device;
   a bus driver stored into the memory, causing the CPU to acquire the command outputted to the device by the device driver and transmit it to the device;
   a device driver identification transmission part to transmit identification information of the device driver to the service provider apparatus via the network;
   a command receiving part to receive a command to the device transmitted from the service provider apparatus via the network; and
   a filter driver stored into the memory, causing the CPU to deliver the command received by the command receiving part to the bus driver; and the service provider apparatus comprises:
   a CPU;
   a device driver request transmission part to transmit a transmission request of the device driver specified by the identification information received by the device driver identification receiving part to the service user apparatus if the device driver management table does not store therein the same identification information of the device driver as the received identification information;
   a device driver receiving part to receive the device driver transmitted from the service user apparatus in response to the transmission request of the device driver:
   a storage storing a plurality of device drivers and storing a device driver management table to store identification information of each device driver, wherein the device driver management table further stores therein introduction status of the device driver, if the device driver management table stores identification information having the same name of the device driver as that of the device driver received by the device driver receiving part but a version of the device driver different from that of the device driver, the device driver installing part uninstalls the device driver, changes the introduction status of the uninstalled device driver in the device driver management table in the storage from "INTRODUCED" to "Temporarily Saving", saves the uninstalled device driver into the storage temporarily, and then installs the device driver received by the device driver receiving part, adds the identification information of the installed device driver to the device driver management table, and sets the introduction status of the installed device driver to "INTRODUCED";
   a device driver identification receiving part to receive identification information of the device driver from the service user apparatus;
   a device driver installing part to install the device driver specified by the received identification information according to comparing the device driver specified by the received identification information with the identification information stored in the device driver management table, in order to enable utilization of the device from an operating system executed by the service provider apparatus;
   a pseudo-bus driver stored in a memory of the service provider apparatus, causing the CPU of the service provider apparatus to acquire a command outputted to the device from the installed device driver when the operating system utilizes the device; and
   a command transmission part to transmit the command acquired by the pseudo-bus driver to the command receiving part of the service user apparatus via the network.

2. The information processing system according to claim 1, wherein the device driver installing part reads out from the storage the device driver specified by the identification information received by the device driver identification receiving part and installs the read-out device driver into the memory of the service provider apparatus if the device driver management table stores therein the same identification information of the device driver as the received identification information.

3. The information processing system according to claim 1, wherein the service user apparatus includes:
  a device driver request receiving part to receive the transmission request of the device driver from the device driver request transmission part; and
  a device driver transmission part to transmit the device driver specified by the identification information transmitted to the service provider apparatus by the device driver identification transmission part to the device driver receiving part in response to the transmission request of the device driver;
  the service provider apparatus further includes the device driver installing part installing the device driver received by the device driver receiving part.

4. The information processing system according to claim 3, wherein
  the identification information of the device driver contains information indicating a name and a version of the device driver, and
  the device driver request transmission part transmits a transmission request of a device driver having the same name and version as those of the device driver specified by the identification information received by the device driver identification receiving part to the service user apparatus if the device driver management table does not store therein identification information of the device driver having the same name and version as those of the device driver specified by the identification information received by the device driver identification receiving part.

5. The information processing system according to claim 4, wherein the service provider apparatus further includes a service utilization end receiving part for receiving a service utilization end notification for ending utilization of the service from the service user apparatus, and
  if the service utilization end receiving part receives the service utilization end notification for ending utilization of the service from the service user apparatus, the device driver installing part uninstalls the device driver which has been installed in the service provider apparatus and installs the device driver which has been saved in the storage storing the device driver management table storing the introduced status of the installed device driver as the "Temporarily Saving."

6. A control method of an information processing system including a service user apparatus to which a device is connected via a device interface and a service provider apparatus connected via a network to enable communication with the service user apparatus to receive input data inputted to the service user apparatus therefrom and execute information processing in accordance with the input data so that service of transmitting result of the execution to the service user apparatus is provided, wherein
  the service user apparatus includes a device driver, a bus driver, a device driver identification transmission part, a command receiving part and a filter driver,
  the service provider apparatus includes a device driver identification receiving part, a device driver installing part, a pseudo-bus driver, a command transmission part, a device driver request transmission part, and a device driver receiving part, and
  the control method comprises:
    outputting, by the device driver, a command to the device when an operating system executed by the service user apparatus utilizes the device and acquiring, by the bus driver, the command outputted to the device by the device driver and transmitting it to the device;
    transmitting, by the device driver identification transmission part, identification information of the device driver to the device driver identification receiving part;
    storing, in a storage of the service provider apparatus, a plurality of device drivers and a device driver management table to store identification information of each device driver, wherein the device driver management table further stores therein introduction status of the device driver, the method further comprising:
      if the device driver management table stores identification information having the same name of the device driver as that of the device driver received by the device driver receiving part but a version of the device driver different from that of the device driver, uninstalling, by the device driver installing part, the device driver, changing the introduction status of the uninstalled device driver in the device driver management table in the storage from "INTRODUCED" to "Temporarily Saving," saving the uninstalled device driver into the storage temporarily, and then installing the device driver received by the device driver receiving part, adding the identification information of the installed device driver to the device driver management table, and setting the introduction status of the installed device driver to "INTRODUCED";
    receiving, by the device driver identification receiving part, the identification information of the device driver;
    installing, by the device driver installing part, the device driver specified by the received identification information according to comparing the device driver specified by the received identification information with the identification information stored in the device driver management table, in order to enable utilization of the device from an operating system executed by the service provider apparatus;
    acquiring, by the pseudo-bus driver, the command outputted to the device from the installed device driver when the operating system utilizes the device;
    transmitting, by the command transmission part, the command acquired by the pseudo-bus driver to the command receiving part via the network;
    receiving, by the command receiving part, the command to the device transmitted by the command transmission part via the network; and
    delivering, by the filter driver, the command received by the command receiving part to the bus driver.

7. The control method of an information processing system according to claim 6, wherein the control method comprises:
  reading out, by the device driver installing part, from the storage the device driver specified by the identification information received by the device driver identification receiving part, and
  installing the read-out device driver into the memory of the service provider apparatus if the device driver management table stores therein the same identification information of the device driver as the received identification information.

8. The control method of an information processing system according to claim 6, wherein
the service user apparatus includes a device driver request receiving part and a device driver transmission part, and the control method comprises:
transmitting, by the device driver request transmission part, a transmission request of the device driver specified by the identification information received by the device driver identification receiving part to the device driver request receiving part if the device driver management table does not store therein the same identification information of the device driver as the received identification information;
receiving, by the device driver request receiving part, the transmission request of the device driver;
transmitting, by the device driver transmission part, the device driver specified by the identification information transmitted to the device driver identification receiving part by the device driver identification transmission part to the device driver receiving part in response to the transmission request of the device driver;
receiving, by the device driver receiving part, the device driver; and
installing, by the device driver installing part, the device driver.

9. The control method of an information processing system according to claim 8, wherein
the identification information of the device driver contains information indicating a name and a version of the device driver, and
the control method comprises:
transmitting, by the device driver request transmission part, a transmission request of a device driver having the same name and version as those of the device driver specified by the identification information received by the device driver identification receiving part to the service user apparatus if the device driver management table does not store therein identification information of the device driver having the same name and version as those of the device driver specified by the identification information received by the device driver identification receiving part.

10. The control method of an information processing system according to claim 9, wherein the service provider apparatus further includes a service utilization end receiving part for receiving a service utilization end notification for ending utilization of the service from the service user apparatus, the method further comprising:
if the service utilization end receiving part receives the service utilization end notification for ending utilization of the service from the service user apparatus, uninstalling, by the device driver installing part, the device driver which has been installed in the service provider apparatus and installing the device driver which has been saved in the storage storing the device driver management table storing the introduced status of the installed device driver as the "Temporarily Saving."

11. A service provider apparatus in an information processing system including a service user apparatus to which a device is connected via a device interface and the service provider apparatus connected via a network to enable communication with the service user apparatus to receive input data inputted to the service user apparatus therefrom and execute information processing in accordance with the input data so that service of transmitting result of the execution to the service user apparatus is provided, the service provider apparatus comprising:
a CPU;
a memory;
a device driver request transmission part to transmit a transmission request of the device driver specified by the identification information received by the device driver identification receiving part to the service user apparatus if the device driver management table does not store therein the same identification information of the device driver as the received identification information;
a device driver receiving part to receive the device driver transmitted from the service user apparatus in response to the transmission request of the device driver;
a storage storing a plurality of device drivers and storing a device driver management table to store identification information of each device driver, wherein the device driver management table further stores therein introduction status of the device driver, the method further comprising:
if the device driver management table stores identification information having the same name of the device driver as that of the device driver received by the device driver receiving part but a version of the device driver different from that of the device driver, uninstalling, by the device driver installing part, the device driver, changing the introduction status of the uninstalled device driver in the device driver management table in the storage from "INTRODUCED" to "Temporarily Saving," saving the uninstalled device driver into the storage temporarily, and then installing the device driver received by the device driver receiving part, adding the identification information of the installed device driver to the device driver management table, and setting the introduction status of the installed device driver to "INTRODUCED";
a device driver identification receiving part to receive identification information of a device driver from a device driver identification transmission part of the service user apparatus including the device driver to output a command to the device when an operating system executed by the service user apparatus utilizes the device,
a bus driver to acquire the command outputted to the device by the device driver and transmit it to the device, the device driver identification transmission part to transmit identification information of the device driver to the service provider apparatus,
a command receiving part to receive the command to the device transmitted from the service provider apparatus and a filter driver to deliver the command received by the command receiving part to the bus driver;
a device driver installing part to install the device driver specified by the received identification information according to comparing the device driver specified by the received identification information with the identification information stored in the device driver management table, in order to enable utilization of the device from an operating system executed by the service provider apparatus;

a pseudo-bus driver stored in the memory of the service provider apparatus, causing the CPU of the service provider apparatus to acquire a command outputted to the device from the installed device driver when the operating system utilizes the device; and a command transmission part to transmit the command acquired by the pseudo-bus driver to the command receiving part of the service user apparatus via the network.

* * * * *